United States Patent
Iwama et al.

(12)

(10) Patent No.: US 6,228,430 B1
(45) Date of Patent: May 8, 2001

(54) SURFACE TREATMENT METHOD AND AGENT

(75) Inventors: Katumi Iwama, Yokosuka; Toshio Yoshimoto, Akiruno; Manabu Saito, Kawagoe; Moriyasu Otaka, Kashiwa, all of (JP)

(73) Assignee: Shinichi AGIO, Niigata (JP)

( * ) Notice: Subject to any disclaimer, the term of this patent is extended or adjusted under 35 U.S.C. 154(b) by 0 days.

(21) Appl. No.: 09/367,216
(22) PCT Filed: Feb. 10, 1997
(86) PCT No.: PCT/JP97/00347
§ 371 Date: Aug. 10, 1999
§ 102(e) Date: Aug. 10, 1999
(87) PCT Pub. No.: WO98/34989
PCT Pub. Date: Aug. 13, 1998

(51) Int. Cl.$^7$ ......................................................... B05D 1/36
(52) U.S. Cl. ..................... 427/407.1; 427/419.3; 427/419.5
(58) Field of Search ................................. 427/409, 407.1, 427/419.1, 419.2, 419.3, 419.5

(56) References Cited
FOREIGN PATENT DOCUMENTS 51-021013 * 6/1976 (JP) .
61-238860 10/1986 (JP) .
7-144797 6/1995 (JP) .

* cited by examiner

*Primary Examiner*—Erma Cameron
(74) *Attorney, Agent, or Firm*—Louise A. Foutch; Dennis G. LaPointe; Mason & Assoc., P.A.

(57) ABSTRACT

The treatment agent is a four-liquid one-powder coloring type agent consisting of a polymeric water emulsion having hydroxyl groups and/or carboxyl groups; a silica-based granular material; a base treatment agent in the state of a liquid; a base reinforcing agent in the state of a liquid; and a coloring agent. The base treatment agent is a mixture generally comprised of a silica-based powder or granular material; a calcium-containing substance coontaining calcium hydroxide and/or a calcium oxide; organic acid and/or salt of organic acid having an acid dissociation exponent ranging from 3 to 5; and water. The base reinforcing agent is a mixture generally comprised of an aqueous solution of alkali silicate; and organic acid and/or salt of organic acid having an acid dissociation exponent ranging from 3 to 5. The coloring agent, which is capable of coating any type of base member with a smooth, strong film having great resistance to water damage, is a mixture generally comprised of the aforementioned base reinforcing agent, silica-based powder serving as a smoothing agent, and a pigment. The surface treatment agent can be applied easily and conveniently and is capable of forming a coating film that can be set to touch in a short period of time.

244 Claims, No Drawings

SURFACE TREATMENT METHOD AND AGENT

TECHNICAL FILED

The present invention relates to a surface treatment agent and method for treating the surface of various materials, such as plastics, woven fabric, non-woven fabric, wood, metal or ceramics. More particularly, the invention relates to a treatment agent for preventing deterioration of, coloring or otherwise treating the surface of said materials and a method of conducting such treatment using said agent.

BACKGROUND ART

Examples of well-known conventional surface treatment agents for preventing deterioration of, coloring or otherwise treating the surface of such materials as plastics, woven fabric, non-woven fabric, wood, metal or ceramics include various organic coating materials generally comprised of high polymer resin, such as epoxy resin, varnish and paint, and inorganic coating materials generally comprised of such an inorganic material as silicate.

As an organic coating material does not have great resistance to weather damage, it is conventionally practiced to use a surface treatment agent containing an inorganic coating material when great weather resistance is required. However, inorganic coating materials have drawbacks in that the range of its usage is limited; although they are capable of coating ceramics well, they are not capable of forming a good coating film on such a base member as plastics, metal, wood, woven fabric or non-woven fabric.

An example to overcome this problem is disclosed in Japanese Patent Provisional Publication No. 43359/1981.

The method described in said Japanese Patent Provisional Publication No. 43359/1981 calls for coating a base member made of wood, metal, glass or concrete with a hardenable coating agent that is a mixture of a water-soluble or water-dispersible alkali metal silicate glass, a water-soluble base having a greater basicity than that of said alkali metal silicate glass, water, and 5 to 90 vol. % of a pigment by applying said coating agent onto the base member and letting the agent stand until it hardens.

In order to make the color of the pigment more uniform by ensuring thorough dispersion of the pigment, which tends to flocculate, the treating method disclosed in Japanese Patent Provisional Publication No. 43359/1981 calls for making a mixture by mixing a water-soluble or water-dispersible alkali metal silicate glass, which serves to have the base member to support the pigment, with water and a water-soluble base having a greater basicity than that of the alkali metal silicate glass, and then mixing the pigment into the mixture with a volume mixing ratio of 5 to 90%. This method, however, has such a drawback that it does not provide a good color coating layer: it presents the possibility of peeling resulting from external impact or stress and lacks water resistance, because the base member is coated by a layer of pigment that is merely formed on the surface of the base member. Furthermore, not only does it take a long period of time to attain a desired hardness but also requires operation for protecting the layer formed by application of the agent from damage and water until the layer becomes sufficiently solid.

An example of a surface treatment agent containing a compound that contains a plurality of carboxyl groups and is selected from the group consisting of organic acids and organic acid salt; a magnesium compound; either fine granular silica or a water-soluble substance containing silicic acid; and water is disclosed in Japanese Patent Provisional Publication No. 320284/1989.

The method described in said Japanese Patent Provisional Publication No. 320284/1989 is adapted to treat the surface of a calcium-containing inorganic material, such as concrete, and calls for adding water to a treatment agent containing a magnesium compound and a compound that contains a plurality of carboxyl groups and is selected from the group consisting of organic acids and organic acid salt, said treatment agent also containing either fine granular silica or a water-soluble substance containing silicic acid; and applying or spraying said mixture of water and treatment agent onto the surface of the calcium-containing inorganic material, such as concrete or mortar. Hardening the calcium-containing inorganic material under the presence of the water produces a water-soluble silicic acid compound from the sodium compound, the silica and calcium hydroxide contained in the concrete, while reaction of the organic acid or the organic acid salt with free magnesium ions and calcium ions generates organic magnesium and organic calcium. Because of the capillary phenomenon and the osmotic pressure, the water-soluble silicic acid compound and the organic calcium permeate capillary pores and gaps in the calcium-containing inorganic material, such as concrete. The organic acid or the organic acid salt that has permeated in the inorganic material and remains therein then acts as a catalyst to cause reaction between the water-soluble silicic acid compound and the calcium hydroxide in the calcium-containing inorganic material, such as concrete, thereby generating a compound containing calcium silicate. Furthermore, reaction of the organic magnesium and the organic calcium with the water-soluble silicic acid compound also generates a compound containing calcium silicate. The structure density of the calcium-containing inorganic material is increased with its capillary pores and gaps thus filled.

The treating method disclosed in Japanese Patent Provisional Publication No. 320284/1989, however, is intended for treating a calcium-containing base member, such as concrete, and not capable of forming a good coating film on a member such as plastic member, wood or woven fabric. Furthermore, the condition of the compound containing calcium silicate varies depending on the amount or conditions of the remaining organic acid and the organic acid salt, because they effect the aforementioned reactions and also permeate the capillary pores and the gaps. In other words, the method presents a problem of being complicated in procedure, because it necessitates meticulous setting of mixing ratio as well as precise control of the atmosphere for the reactions. Furthermore, it takes a long period of time to attain a desired hardness and requires operation for protecting the layer formed by application of the agent from damage and water until the layer becomes sufficiently solid.

In order to solve the above problems, an object of the present invention is to provide a surface treatment agent and a treatment method using such a treatment agent, said treatment agent and method being capable of treating any base member easily and quickly by means of a strong coating film so as to prevent deterioration of the surface of the base member. Another object of the invention is to provide a treatment agent and a method using the same, said agent and method being capable of coloring a base member easily and quickly by means of a strong coating film which has great resistance to weather and water damage.

DISCLOSURE OF INVENTION

A surface treatment agent according to the invention includes highly adhesive polymeric water emulsion to be applied onto the surface of a base member in the manner of a thin film and containing either one of or both hydroxyl groups (—OH) and carboxyl groups (—COOH); a silica-based granular material generally comprised of silicon oxide ($SiO_2$) and adapted to be supported by said polymeric water emulsion in such a state that at least a part of the silica-based granular material is exposed from the polymeric water emulsion; a base treatment agent in the state of a liquid containing a silica-based powder or granular material generally comprised of silicon oxide ($SiO_2$), a calcium-containing substance containing either one of or both calcium hydroxide ($Ca(OH)_2$) and calcium oxide (CaO), water ($H_2O$), and either one of or both organic acid and organic acid salt which have an acid dissociation exponent (pKa) ranging from 3 to 5, said base treatment agent adapted to be applied in the manner of a thin film onto the surface of a coating film of said polymeric water emulsion so as to cover the exposed part of said silica-based granular material; and a base reinforcing agent in the state of a liquid to be applied in the manner of a thin film onto the surface of the coating film of the base treatment agent on the polymeric water emulsion, said base reinforcing agent containing an aqueous solution of alkali silicate, and either one of or both organic acid and organic acid salt that have an acid dissociation exponent (pKa) ranging from 3 to 5.

The highly adhesive polymeric water emulsion containing either one of or both hydroxyl groups (—OH) and carboxyl groups (—COOH) is applied onto the surface of a base member in the manner of a thin film; the silica-based granular material generally comprised of silicon oxide ($SiO_2$) is sprayed or otherwise applied onto the film of the polymeric water emulsion before the polymeric water emulsion becomes hard so that the silica-based granular material is supported on the polymeric water emulsion in such a state that at least a part of the silica-based granular material is exposed from the film of the polymeric water emulsion; and, thereafter, the liquid base treatment agent is applied in the manner of a thin film onto the surface of the polymeric water emulsion in such a state that the base treatment agent covers the exposed part of said silica-based granular material. As a result of the application of the base treatment agent, along with decrease of moisture ($H_2O$) due to vaporization or other causes, the catalytic action of the organic acid and the organic acid salt and other factors cause pozzolanic reaction of silicone oxide in the silica-based granular material, which is supported on the polymeric water emulsion, with calcium hydroxide ($Ca(OH)_2$) contained in the calcium-containing substance in the base treatment agent and calcium hydroxide generated as a result of combination of water and calcium oxide (CaO) so that calcium silicate ($CaSiO_3$) and CaO—SiO— ... —SiO— ... —SiO—CaO (C—O—S—O—C), which is an insoluble chain compound, are generated in such a manner as to be intertwined with each other, while the silicon oxide in the silica-based powder or granular material in the base treatment agent generates, through pozzolanic reaction with calcium hydroxide contained in the calcium-containing substance and also with calcium hydroxide generated as a result of combination of water and calcium oxide, CaO—SiO— ... —SiO— ... —SiO—CaO (C—O—S—O—C), which is an insoluble chain compound, and $CaSiO_3$ in such a manner that the CaO—SiO— ... —SiO— ... —SiO—CaO (C—O—S—O—C) and the $CaSiO_3$ are intertwined with each other. Furthermore, Si—O—Si bonds are formed by hydrogen bonding and dehydro-condensation between silicon oxide in the silica-based granular material and silicon oxide in the silica-based powder or granular material and also between silicon oxide in the silica-based powder or granular material and another silicon oxide in the silica-based powder or granular material. By means of these bonds, a dense, three-dimensional network structure having a plurality of hydroxyl groups (—OH) is formed in such a manner that a part of the calcium hydroxide molecules that are either contained in the calcium-containing substance or have been generated as a result of the combination of water with the calcium oxide are enclosed in said network structure. Next, a base reinforcing agent is applied in the manner of a thin film onto the surface of the thin coating film of the base treatment agent having the network structure as described above. As a result of application of the base reinforcing agent, such factors as catalytic action of the organic acid or the organic acid salt having an acid dissociation exponent (pKa) ranging from 3 to 5 and the like cause the alkali silicate to react with calcium hydroxide that have remained unreacted in such a state as to be supported in the network structure of the base treatment agent. The reaction of the alkali silicate produces calcium silicate and C—O—S—O—C bonds in such a manner that the alkali in the alkali silicate is enveloped and thus trapped in the network structure, while the density of the network structure is further increased, with the alkali in the alkali silicate enveloped in the network structure, by means of bonding of alkali silicate with C—O—S—O—C and Si—O—Si bonds that constitute the hydroxyl groups and the network structure of the base treatment agent, bonding among alkali silicate molecules, and bonding between the silica-based powder or granular material and alkali silicate. Thus, a dense, three-dimensional network structure is grown and integrated with the network structure of the base treatment agent. Should the organic acid or the organic acid salt has an acid dissociation exponent (pKa) of less than 3, various reactions, such as pozzolanic reaction of the silica-based granular material with the calcium hydroxide ($Ca(OH)_2$) in the base treatment agent and condensation polymerization, becomes extremely slow, and formation of a film takes an undesirably long time. On the other hand, an acid dissociation exponent (pKa) exceeding 5 makes various reactions, such as pozzolanic reaction and condensation polymerization, too fast. Such an exceedingly fast reaction results in uneven, partial progress of reaction, which makes formation of a uniform film impossible. Another unfavorable result is substantial contraction action, which may form cracks in the coating film or, in some cases, cause the agent to become powder and peel, making the formation of the film impossible. In order to prevent such problems, an organic acid or an organic acid salt whose acid dissociation exponent (pKa) ranges from 3 to 5, is used according to the invention.

As described above, a silica-based granular material is securely supported on a base member by means of a polymeric water emulsion, and a dense, three-dimensional network structure with the silica-based granular material serving as the foundation of formation of the network so that a base member is coated with a coating film which has great strength and resistance to water and weather damage. Therefore, according to the invention, surface treatment for preventing deterioration of the surface of a base member can be conducted easily and quickly with increased operation efficiency regardless of the type of base member.

According to another feature of the invention, the surface treatment agent of the invention described above includes a coloring agent in the state of a liquid to be applied in the manner of a thin film onto the surface of a coating film of the aforementioned base reinforcing agent and containing an alkali silicate solution having a composition according to the invention and described above, a pigment, and either one of or both organic acid and organic acid salt which have an acid dissociation exponent (pKa) ranging from 3 to 5.

As a result of application of a coloring agent onto the surface of a coating film of a base reinforcing agent, which has been integrated with a coating film of a base treatment agent into a dense body by means of a network structure in the manner described above, such factors as catalytic action of the organic acid or the organic acid salt having an acid dissociation exponent (pKa) ranging from 3 to 5 link the alkali silicate with calcium hydroxide ($Ca(OH)_2$) that has remained in the base reinforcing agent without undergoing reaction and also with C—O—S—O—C bonds and Si—O—Si bonds, thereby growing a dense, three-dimensional network structure with the alkali in the alkali silicate and the coloring agent secured in such a manner as to be enveloped and trapped in the network structure and integrating it with the film of the reinforcing agent.

As described above, a coating film which has great strength and resistance to water and weather damage is formed on a base member by growing a dense network structure with the silica-based granular material, which is securely supported on the base member by means of a polymeric water emulsion, serving as the foundation of formation of the network, while securing the pigment in the network. Therefore, regardless of the type of base member, the invention is capable of conducting surface treatment to prevent deterioration of or color the surface of the base member easily and quickly with increased operation efficiency and also capable of expanding the range of usage of the base member by coloring the member so as to improve it from an aesthetic point of view and also make it easy to differentiate.

According to another feature of the invention, at least one of the agents selected from among the base treatment agent, base reinforcing agent, and coloring agent, contains metal oxide.

Mixing metal oxide into at least one of the agents selected from among the base treatment agent, base reinforcing agent, and coloring agent increases the structure density of the network structure and thus provides a strong thin coating film, with the metal oxide entering between and becoming connected with chain compounds of Si—O—Si bonds in the network structure in a three-dimensional state.

Therefore, inclusion of metal oxide has such a benefit as increasing the structure density of the dense network structure even further, and also increasing the weather resistance, the water resistance and the strength of the material.

According to another feature of the invention, the calcium-containing substance in the base treatment agent of the invention described above contains either one of or both calcium hydroxide and calcium oxide at a total weight ratio, which is calculated in terms of calcium hydroxide, of 0.2 to 2 times the weight ratio of the silica-based powder or granular material.

By using a base treatment agent containing a calcium-containing substance which includes either one of or both calcium hydroxide and calcium oxide at a total weight ratio, which is calculated in terms of calcium hydroxide, of 0.2 to 2 times the weight ratio of the silica-based powder or granular material, a dense network structure can be formed easily and quickly in such a state that the silica-based powder or granular material are firmly linked and integrated with calcium hydroxide ($Ca(OH)_2$) of the base member and that the calcium hydroxide is enveloped and secured in the network structure while having a plurality of hydroxyl groups (—OH). When the weight ratio of calcium-containing substance calculated in terms of calcium hydroxide is less than 0.2 times the weight ratio of the silica-based powder or granular material, it is impossible to increase the strength of a film formed of the base treatment agent or increase the reactivity of the base treatment agent with the base reinforcing agent, and, therefore, it is impossible to form a coating film having sufficient strength within a short period of time. The calcium-containing substance in a quantity calculated in terms of calcium hydroxide exceeding 2 times the weight ratio of the silica-based powder or granular material increases the amount of the calcium hydroxide secured in the network structure, making it impossible to increase the strength, water resistance, reactivity with the base reinforcing agent or smoothness of the coating film or increasing the operation efficiency. Furthermore, it may also present the problem of efflorescence due to calcium moving to the surface of the coating film. In order to prevent these problems, the weight ratio of the calcium-containing substance is limited in the range of 0.2 to 2 times the weight ratio of the silica-based powder or granular material.

Therefore, as the weight ratio of the calcium-containing substance calculated in terms of calcium hydroxide is limited in the range of 0.2 to 2 times the weight ratio of the silica-based powder or granular material, it is easy to form within a short period of time a coating film of the base treatment agent, which is strong and highly resistant to weather and water damage and has a dense, three-dimensional network structure that be firmly integrated with a coating film of the polymeric water emulsion and is capable of securing calcium hydroxide in such a manner that the calcium hydroxide is enveloped in the network structure while having a plurality of hydroxyl groups.

According to yet another feature of the invention, the organic acid and the organic acid salt used in the base treatment agent contain at least one kind of organic acid or a salt of an organic acid selected from a group consisting of gluconic acid, spiculisporic acid, lactic acid, acetic acid, propionic acid, and salts of these acids and having a total weight ratio of 0.01 to 0.1 times the total weight ratio of the silica-based powder or granular material and the calcium-containing substance, and either one of or both arabic acid and a salt of arabic acid having a total weight ratio of 0.1 to 0.5 times the total weight ratio of the silica-based powder or granular material and the calcium-containing substance.

As the organic acid and the organic acid salt used in the base treatment agent contain at least one kind of organic acid or a salt of an organic acid selected from a group consisting of gluconic acid, spiculisporic acid, lactic acid, acetic acid, propionic acid, and salts of these acids and having a total weight ratio of 0.01 to 0.1 times the total weight ratio of the silica-based powder or granular material and the calcium-containing substance, and either one of or both arabic acid and a salt of arabic acid having a total weight ratio of 0.1 to 0.5 times the total weight ratio of the silica-based powder or granular material and the calcium-containing substance, reactions of the silica-based powder or granular material and the calcium-containing substance in the base treatment agent progress rapidly and virtually uniformly without changing the quality of a coating film of the polymeric water emulsion so that a dense, three-dimensional network structure having strong and insoluble bonds is formed. In cases where the weight ratio of the organic acid and the organic acid salt, which have been selected from a group consisting of gluconic acid, spiculisporic acid, lactic acid, acetic acid, propionic acid and salts of these acids, is less than 0.01 times the total weight ratio of the silica-based powder or granular material and the calcium-containing substance, their reactivity with the silica-based granular material supported by the polymeric water emulsion, the reactivity with the polymeric water emulsion, and the reactivity of the base treatment agent itself are reduced, and it becomes difficult to obtain a strong, integral structure. As a result, it becomes impossible to give a coating film increased strength, weather resistance or ability to permit materials to be thoroughly dispersed therein, and therefore, difficult to obtain a uniform, smooth film or increase the operation efficiency. In cases where the weight ratio of the organic acid and the organic acid salt that have been selected from a group consisting of gluconic acid, spiculisporic acid, lactic acid, acetic acid, propionic acid and salts of these acids exceeds 0.1 times the total weight ratio of the silica-based powder or granular material and the calcium-containing substance, the organic acid and the organic acid salt that did not undergo reaction remain between network structures, making it difficult to obtain a satisfactory strength, water resistance or weather resistance and increasing costs. In order to prevent these problems, the weight ratio of the organic acid and the organic acid salt that have been selected from a group consisting of gluconic acid, spiculisporic acid, lactic acid, acetic acid, propionic acid and salts of these acids is limited in the range of 0.01 to 0.1 times the total weight ratio of the silica-based powder or granular material and the calcium-containing substance. Furthermore, the weight ratio of the arabic acid and the arabic acid salt of less than 0.1 times the total weight ratio of the silica-based powder or granular material and the calcium-containing substance reduces their reactivity with the silica-based granular material supported by the polymeric water emulsion, the reactivity with the polymeric water emulsion, and the reactivity of the base treatment agent itself, thereby making it difficult to obtain a strong, integral structure, and consequently making it impossible to increase the strength, weather resistance or water resistance of the coating film. The weight ratio of the arabic acid and the arabic acid salt exceeding 5 times the total weight ratio of the silica-based powder or granular material and the calcium-containing substance causes unreacted organic acid and organic acid salt to remain in the network structure, making it difficult to obtain a satisfactory strength, water resistance or weather resistance and increasing costs. In order to prevent these problems, the weight ratio of the arabic acid and the arabic acid salt is limited in the range of 0.1 to 5 times the total weight ratio of the silica-based powder or granular material and the calcium-containing substance.

Therefore, by using organic acid and salt of organic acid that contain at least one kind of organic acid or a salt of an organic acid selected from a group consisting of gluconic acid, spiculisporic acid, lactic acid, acetic acid, propionic acid, and salts of these acids and having a total weight ratio of 0.01 to 0.1 times the total weight ratio of the silica-based powder or granular material and the calcium-containing substance, and either one of or both arabic acid and a salt of arabic acid having a total weight ratio of 0.1 to 0.5 times the total weight ratio of the silica-based powder or granular material and the calcium-containing substance, a coating film which is smooth and strong and has great ability to withstand water and weather damage can be formed easily and quickly.

According to yet another feature of the invention, the aqueous solution of alkali silicate described above is a 15 to 40% solution of an alkali silicate, of which the molar ratio of the silicon oxide ($SiO_2$) to the alkali is in the range of 5 to 7.5.

As a result of using a 15 to 40% aqueous solution of an alkali silicate, of which the molar ratio of the silicon oxide ($SiO_2$) to the alkali is in the range of 5 to 7.5, alkali silicate becomes connected with hydroxyl groups, C—O—S—O—C bonds and Si—O—Si bonds in a thin film of a base treatment agent within a short period of time, thereby growing a dense network structure, while bonds among alkali silicate rapidly proceeds. A molar ratio of the silicon oxide ($SiO_2$) to the alkali of less than 5 overly increases the amount of alkali that has to be enveloped and thus remaining in a network structure, and, therefore, makes it impossible to continue to retain all the alkali. As a result, it becomes impossible to increase the strength, water resistance or weather resistance. A molar ratio of the silicon oxide ($SiO_2$) to the alkali exceeding 7.5 reduces reactivity of the silicon oxide with the base treatment agent and impairs structural integration and growth of the network structure. Therefore, the molar ratio of silicon oxide ($SiO_2$) to the alkali is limited in the range of 5 to 7.5. In cases where the aqueous solution of an alkali silicate has a concentration of less than 15%, the absolute quantity of the alkali silicate is insufficient to properly react with a base treatment agent, and there arises the need to increase the amount of application. Increasing the application amount, however, also increases the possibility of dripping or other undesirable problems and necessitates application of an agent in multiple layers, consequently reducing the operation efficiency and increasing the cost of operation. In addition, as the quantity of residual alkali that is trapped and thus remain in the three-dimensional network structure increases, it becomes impossible to continue to trap the alkali, resulting in reduced strength, water resistance and weather resistance. An alkali silicate solution having a concentration of more than 40% does not have a sufficient water content and causes the alkali silicate to start to be linked with each other before application of the agent and also increases the viscosity of the agent. Therefore, not only is it impossible to obtain a smooth coating film but the operation efficiency is also reduced. In order to prevent such problems, the concentration of the aqueous solution of alkali silicate is limited in the range of 15 to 40%.

As described above, by using a 15 to 40% solution of an alkali silicate whose molar ratio of the silicon oxide ($SiO_2$) to the alkali is in the range of 5 to 7.5, a dense, integral network structure can be obtained easily in a short period of time through a rapid and easy reaction with a base treatment agent.

According to yet another feature of the invention, the metal oxide mentioned above has a weight ratio of 0.1 to 5 times the weight ratio of the alkali silicate solution remaining after the weight of water has been subtracted.

Inclusion of metal oxide at a weight ratio of 0.1 to 5 times that of the alkali silicate solution remaining after the weight of water has been subtracted forms a dense, three-dimensions network structure, because molecules of the metal oxide rapidly enter between the chain compounds of the Si—O—Si bonds in the existing network structure and connects them together. The weight ratio of the metal oxide is limited in the range of 0.1 to 5 times the weight ratio of the aqueous solution of alkali silicate remaining after the weight of water has been subtracted, because metal oxide less than 0.1 times the weight ratio of the alkali silicate solution remaining after the weight of water has been subtracted coarsens the dense bond of the three-dimensional network structure and makes it impossible to increase the strength, water resistance or weather resistance of the treated object, while metal oxide having a weight ratio exceeding 5 times the weight ratio of the alkali silicate solution remaining after the weight of water has been subtracted results in a part of the metal oxide not involved in linking the chain compounds and supported and remaining in the network structure. Such excessive metal oxide not only makes it impossible to attain such objectives as increases in the strength, weather resistance or water resistance of the treated material but also causes the color of the metal oxide to tint the coating film, thereby impairing satisfactory coloring and increasing costs. In order to prevent such problems, the weight ratio of the metal oxide is limited in the range of 0.1 to 5 times the weight ratio of the alkali silicate solution remaining after the weight of water has been subtracted.

As described above, inclusion of metal oxide at a weight ratio ranging from 0.1 to 5 times the weight ratio of the alkali silicate solution remaining after the weight of water has been subtracted has such a benefit as increasing the structure density of the dense network structure even further, and also increasing the weather resistance, the water resistance and the strength of the material.

According to yet another feature of the invention, the organic acid and the organic acid salt used in either one of or both the base reinforcing agent and color agent contain at least one kind of organic acid or a salt of an organic acid selected from a group consisting of gluconic acid, spiculisporic acid, lactic acid, acetic acid, propionic acid, and salts of these acids and having a total weight ratio of 0.01 to 0.1 times the weight ratio of the alkali silicate solution remaining after the weight of water has been subtracted, and either one of or both arabic acid and a salt of arabic acid having a total weight ratio of 0.1 to 0.5 times the weight ratio of the alkali silicate solution remaining after the weight of water has been subtracted.

As the organic acid and the organic acid salt used in either one of or both the base reinforcing agent and color agent contains at least one kind of organic acid or a salt of an organic acid selected from a group consisting of gluconic acid, spiculisporic acid, lactic acid, acetic acid, propionic acid, and salts of these acids and having a total weight ratio of 0.01 to 0.1 times the weight ratio of the alkali silicate solution remaining after the weight of water has been subtracted, and either one of or both arabic acid and a salt of arabic acid having a total weight ratio of 0.1 to 0.5 times the weight ratio of the alkali silicate solution remaining after the weight of water has been subtracted, alkali silicate is allowed to be connected with such substances in a thin film of a base treatment agent or a base reinforcing agent as hydroxyl groups (—OH), calcium hydroxide (Ca(OH)$_2$), C—O—S—O—C bonds and Si—O—Si bonds within a short period of time, thereby growing a dense network structure, while bonding among alkali silicate molecules rapidly proceeds. Therefore, a strong coating film that has great resistance to weather and water damage and is integrated with either the base treatment agent or the base reinforcing agent can be formed easily and quickly. A weight ratio of the organic acid and the organic acid salt that have been selected from a group consisting of gluconic acid, spiculisporic acid, lactic acid, acetic acid, propionic acid and salts of these acids of less than 0.01 times the weight ratio of the alkali silicate solution remaining after the weight of water has been subtracted impairs the reactivity of the alkali silicate with the base treatment agent or the base reinforcing agent and inter-reaction of the alkali silicate molecules, and consequently reduces the degree of integration of the coating films. Therefore, it becomes impossible to increase the strength, water resistance, weather resistance or dispersibility of materials and, consequently, it becomes difficult to obtain a uniform, smooth film or increase the operation efficiency. In cases where the weight ratio of the organic acid and the organic acid salt that have been selected from a group consisting of gluconic acid, spiculisporic acid, lactic acid, acetic acid, propionic acid and salts of these acids exceeds 0.1 times the weight ratio of the alkali silicate solution remaining after the weight of water has been subtracted, unreacted organic acid and organic acid salt remain in a network structure so that it is difficult to obtain satisfactory strength or resistance to water or weather damage or avoid cost increase. In order to prevent these problems, the weight ratio of the organic acid and the organic acid salt that have been selected from a group consisting of gluconic acid, spiculisporic acid, lactic acid, acetic acid, propionic acid and salts of these acids is limited in the range of 0.01 to 0.1 times the weight ratio of the alkali silicate solution remaining after the weight of water has been subtracted. Furthermore, the weight ratio of the arabic acid and the arabic acid salt of less than 0.1 times the weight ratio of the alkali silicate solution remaining after the weight of water has been subtracted impairs proper progress of reaction of the alkali silicate with the base treatment agent and the base reinforcing agent as well as inter-reaction among the alkali silicate molecules and consequently makes it impossible to increase the strength or the resistance to water and weather damage. The weight ratio of the arabic acid and the arabic acid salt exceeding 5 times the weight ratio of the alkali silicate solution remaining after the weight of water has been subtracted causes unreacted organic acid and organic acid salt to remain in the network structure, making it difficult to obtain satisfactory strength or resistance to water or weather damage and also presenting the problem of cost increase. In order to prevent these problems, the weight ratio of the arabic acid and the arabic acid salt is limited in the range of 0.1 to 5 times the weight ratio of the alkali silicate solution remaining after the weight of water has been subtracted.

Therefore, by using organic acids and salt of organic acids that contain at least one kind of organic acid or a salt of an organic acid selected from a group consisting of gluconic acid, spiculisporic acid, lactic acid, acetic acid, propionic acid, and salts of these acids and having a total weight ratio of 0.01 to 0.1 times the weight ratio of the alkali silicate solution remaining after the weight of water has been subtracted, and either one of or both arabic acid and a salt of arabic acid having a total weight ratio of 0.1 to 0.5 times the weight ratio of the alkali silicate solution remaining after the weight of water has been subtracted, a coating film which is smooth and strong and has great resistance to weather and water damage can be formed easily and quickly.

According to yet another feature thereof, either one of or both the base treatment agent and the base reinforcing agent according to the invention described above contain a pigment or pigments.

Inclusion of a pigment in a base treatment agent ensures the pigment to be firmly supported between molecules of calcium silicate (CaSiO$_3$), which have been generated as a result of reaction of the base treatment agent with the polymeric water emulsion and reaction of the base treatment agent with silica-based granular material, and enveloped in the network structure without the potential of the pigment peeling off or being otherwise removed from the base member. As a result, the base member is colored well and virtually evenly with its resistance to weather and water damage and strength being increased. Furthermore, as coloring the base member improves it from an aesthetic point of view and also makes it easy to differentiate, the range of its usage is expanded. By including a pigment in a base reinforcing agent, the pigment is enveloped and secured without the potential of the pigment peeling off or being otherwise removed from the surface of the base member at the time of reaction of the base reinforcing agent with the base treatment agent, so that the base member is colored well and virtually evenly. As a result, the resistance to weather and water damage and the strength of the base member are increased, while the range of its usage is expanded, because coloring the base member improves it from an aesthetic point of view and also makes it easy to differentiate. Using a base treatment agent and a base reinforcing agent respectively containing pigments provides a surface treatment agent having a superior coloring capability in that it enables the complex coloring as well as gradation coloring, thereby improving the base member even further from an aesthetic point of view and also making it easier to differentiate.

As described above, inclusion of a pigment or pigments in either one of or both the base treatment agent and the base reinforcing agent ensures the pigment(s) to be securely supported without the potential of inadvertently peeling off or being otherwise removed from the surface of the base material, and is capable of coloring the base material well and virtually evenly, thereby improving it from an aesthetic point of view, making it easy to differentiate and consequently expanding the range of usage of the base member.

According to yet another feature thereof, the pigment according to the invention described above is an inorganic pigment having a weight ratio ranging from 0.1 to 12 times the total weight ratio of the silica-based powder or granular material and the calcium-containing substance or the weight ratio of the alkali silicate solution remaining after the weight of water has been subtracted.

By using an inorganic pigment having a weight ratio ranging from 0.1 to 12 times the total weight ratio of the silica-based powder or granular material and the calcium-containing substance or the weight ratio of the alkali silicate solution remaining after the weight of water has been subtracted as a pigment to be contained in an agent, a good, virtually even and beautifully colored coating film which has great strength and resistance to weather and water damage and is easy to differentiate can be formed on a base member easily and without the potential of the coating film peeling off or being otherwise removed from the surface of the base member. A pigment having a weight ratio of less than 0.1 times the total weight ratio of the silica-based powder or granular material and the calcium-containing substance or the weight ratio of the alkali silicate solution remaining after the weight of water has been subtracted reduces the coloring ability of the agent and necessitates a thick film in order to obtain a desired color. A thick coating film, however, presents the potential of peeling off and results in reduced operation efficiency and increase in costs. In cases where the weight ratio of a pigment exceeds 12 times the total weight ratio of the silica-based powder or granular material and the calcium-containing substance or the weight ratio of the alkali silicate solution remaining after the weight of water has been subtracted, a part of the pigment fails to be securely enveloped in the network structure. Such an excessive pigment not only presents the possibility of seeping out and impairing formation of a network structure but also increases costs while being unable to increase the coloring ability of the agent. Using an organic pigment makes it difficult to increase the weather resistance and also presents the potential of impairing formation of a network structure. Therefore, according to the invention, an inorganic pigment is used at a ratio ranging from 0.1 to 12 times the total weight ratio of the silica-based powder or granular material and the calcium-containing substance or the weight ratio of the alkali silicate solution remaining after the weight of water has been subtracted.

As described above, by using an inorganic pigment having a weight ratio ranging from 0.1 to 12 times the total weight ratio of the silica-based powder or granular material and the calcium-containing substance or the weight ratio of the alkali silicate solution remaining after the weight of water has been subtracted as a pigment to be contained in an agent, a good, virtually even and beautifully colored coating film which has great strength and resistance to weather and water damage and is easy to differentiate can be formed on a base member easily and without the potential of the coating film peeling off or being otherwise removed from the surface of the base member.

According to yet another feature of the invention, either one of or both the base reinforcing agent and coloring agent described above contain porous, amorphous silica-based powder at the mixing ration ranging from 1.0 to 15 times the weight ratio of the alkali silicate solution remaining after the weight of water has been subtracted.

As a result of inclusion of porous, amorphous silica-based powder at the mixing ration ranging from 1.0 to 15 times the weight ratio of the alkali silicate solution remaining after the weight of water has been subtracted in either one of or both the base reinforcing agent and coloring agent, the porous, amorphous silica-based powder reacts with calcium hydroxide and silicone oxide that have remained in the unreacted state, thereby generating calcium silicate, as well as C—O—S—O—C and Si—O—Si bonds so that a dense network structure is grown while contraction that otherwise occurs when the network structure is formed is limited. Thus, small cracks are prevented from being formed on the surface of the coating film. Therefore, a good, thin coating film which is smoother and lustrous can be obtained. When the weight ratio of the porous, amorphous silica-based powder is less than 1.0 times the weight ratio of the alkali silicate solution remaining after the weight of water has been subtracted, the film cannot be made smoother, because it is impossible to limit contraction and therefore impossible to prevent cracks. The weight ratio of the porous, amorphous silica-based powder exceeding 15 times the weight ratio of the alkali silicate solution remaining after the weight of water has been subtracted increases the viscosity of the agent, which is not only inconvenient to conduct operation of forming a coating film but also results in a thicker coating film and increased costs. In order to prevent these problems, the weight ratio of the porous, amorphous silica-based powder is limited in the range of 1.0 to 15 times the weight ratio of the alkali silicate solution remaining after the weight of water has been subtracted.

As described above, inclusion of porous, amorphous silica-based powder in either one of or both the base reinforcing agent and coloring agent at the mixing ratio ranging from 1.0 to 15 times the weight ratio of the alkali silicate solution remaining after the weight of water has been subtracted enables the prevention of formation of small cracks on the surface of the coating film by limiting contraction, which otherwise occurs when the network structure is formed, and thus provides a good, thin coating film which is smoother and lustrous.

A surface treatment method according to the invention calls for applying the highly adhesive polymeric water emulsion of the surface treatment agent according to the invention described above in the manner of a thin film onto the surface of a base member, said polymeric water emulsion containing either one of or both hydroxyl groups (—OH) and carboxyl groups (—COOH); placing a silica-based granular material generally comprised of silicon oxide ($SiO_2$) on said thin film of the polymeric water emulsion before the polymeric water emulsion becomes hard so that the silica-based granular material is supported by the polymeric water emulsion in such a state that at least a part of the silica-based granular material is exposed from the polymeric water emulsion; thereafter, forming a thin coating film of the base treatment agent of said surface treatment agent by applying said base treatment agent onto the thin film of the polymeric water emulsion in such a manner that that the base treatment agent covers the exposed part of said silica-based granular material; and applying the base reinforcing agent of said surface treatment agent in the manner of a thin film onto the surface of said thin film of the base treatment agent.

As described above, after the base treatment agent is applied in the manner of a thin film onto a thin film of the polymeric water emulsion, which has been formed by applying the polymeric water emulsion onto the surface of the base member and supports the silica-based granular material thereon, a thin coating film of the base reinforcing agent is formed by applying the base reinforcing agent onto the surface of the thin of the base treatment agent. Therefore, regardless of the type of base member to be treated, various treatment operations, such as one for preventing surface deterioration of the base member or coloring the base member can be conducted easily with increased efficiency.

As described above, regardless of the type of base member to be treated, a method according to the invention enables the easy treatment of the surface of the base member, such as one for preventing surface deterioration or coloring, and increases the operation efficiency, because the method merely calls for applying the base treatment agent onto a film of the polymeric water emulsion supporting the silica-based granular material, and then applying the base reinforcing agent onto the coating film of the base treatment agent.

A method according to another feature of the invention calls for applying the highly adhesive polymeric water emulsion of the surface treatment agent according to the invention described above in the manner of a thin film onto the surface of a base member, said polymeric water emulsion containing either one of or both hydroxyl groups (—OH) and carboxyl groups (—COOH); placing a silica-based granular material generally comprised of silicon oxide ($SiO_2$) on said thin film of the polymeric water emulsion before the polymeric water emulsion becomes hard so that the silica-based granular material is supported by the polymeric water emulsion in such a state that at least a part of the silica-based granular material is exposed from the polymeric water emulsion; thereafter, forming a thin coating film of the base treatment agent by applying said base treatment agent onto the thin film of the polymeric water emulsion in such a manner that that the base treatment agent covers the exposed part of said silica-based granular material; applying the base reinforcing agent of said surface treatment agent in the manner of a thin film onto the surface of said thin film of the base treatment agent; and, thereafter, applying the aforementioned coloring agent onto the surface of said coating film of the base reinforcing agent, thereby forming a thin film of the coloring agent.

As described above, after the base treatment agent is applied in the manner of a thin film onto a thin film of the polymeric water emulsion, which has been formed by applying the polymeric water emulsion onto the surface of the base member and supports the silica-based granular material thereon, the base reinforcing agent and the coloring agent are applied in sequence in the manner of a thin film. Therefore, regardless of the type of base member to be treated, various treatment operations, such as one for preventing surface deterioration of the base member or coloring the base member can be conducted easily with increased efficiency.

As described above, regardless of the type of base member to be treated, a method according to the invention enables the easy treatment of the surface of a base member, such as one for preventing surface deterioration or coloring, and increases the operation efficiency, because the method merely calls for applying a polymeric water emulsion onto the surface of a base member so as to support a silica-based granular material, and, thereafter, applying a base treatment agent, a base reinforcing agent and a coloring agent in sequence.

BEST MODE FOR CARRYING OUT THE INVENTION

In order to explain the invention in detail, a first embodiment of the invention is explained hereunder.

The surface treatment agent is a three-liquid one-powder type agent consisting of a liquid polymeric water emulsion in the state of a water slurry, a silica-based granular material in the state of a fine powder, a liquid base treatment agent in the state of a water slurry and a liquid base reinforcing agent in the state of a water slurry.

The polymeric water emulsion a water-soluble substance produced by emulsifying a highly adhesive polymer containing either one of or both hydroxyl groups (—OH) and carboxyl groups (—COOH). Examples of polymers used for this purposed include acrylic polymer, acryl-styrene copolymer, vinyl acetate polymer, vinyl acetate-ethylene copolymer.

The polymeric water emulsion preferably contains 15 to 30% solids. A less than 15% solid content not only impairs tight adhesion of the emulsion to the base member but also reduces its ability to support the silica-based granular powder, which will be explained later. As it necessitates application of the emulsion in several layers, the operation efficiency is reduced. A more than 30% solid content increases the viscosity of the emulsion and complicates application operation, making it difficult to form a coating film with a virtually uniform thickness and reducing the operation efficiency. In order to prevent these problems, the weight ratio of solids in the polymeric emulsion is desirably limited in the range of 15 to 30%.

The polymeric emulsion described above is applied onto the surface of a base member so as to form a coating film having a thickness of, for example, 200 to 1000 μm.

Examples of silica-based granular material used for the composition include silica fume, silica rock and calcined pearlite. These materials may desirably undergo a dehydration-thermal treatment to enhance activity of silicon oxide contained therein. Foam-expanded calcined pearlite is particularly preferable because of its high potential for reaction and ability to prevent cracks by limiting contraction of the film when it is formed. Silica fume in the state of generally spherical fine particles is also desirable, because it requires less water to be added and thus facilitates treatment operation. A silica-based granular material used for the composition has a particle diameter greater than the thickness of the coating film of the polymeric water emulsion (desirably about two to three times the thickness of the coating film of the polymeric water emulsion) in order to ensure the silica-based granular material to be embedded in, and thus supported by, the coating film of the polymeric water emulsion in such a state that a part of the silica-based granular material is exposed from the emulsion. In cases where the coating film of the polymeric water emulsion has a thickness of, for example, 3.0 μm, it is desirable that the silica-based granular material used has a particle diameter ranging from 6.0 to 10.0 μm. In cases where the silica-based granular material has a particle diameter of less than 6.0 μm, the would almost completely be buried in the coating film of the polymeric emulsion so that it would be unable to react with the base treatment agent described later and also difficult to be supported in the coating film of the polymeric emulsion in such a state that a part of the silica-based granular material is exposed from the coating film of the polymeric emulsion. A silica-based granular material having a particle diameter greater than 10.0 μm would result in too large a part of the silica-based granular material being exposed from the coating film of the polymeric water emulsion, relatively reducing the ability of the coating film of the polymeric water emulsion to support the silica-based granular material and making it impossible to conduct treatment of the surface of the base member smoothly. In order to prevent these problems, it is desirable to limit the particle diameter of the silica-based granular material used for the composition in the range of about two to three times the thickness of the coating film of the polymeric water emulsion.

The base treatment agent mentioned above is a mixture generally comprised of a silica-based powder or granular material generally comprised of silicon oxide ($SiO_2$), a calcium-containing substance such as lime, cement or the like, water ($H_2O$), and either one of or both organic acid and organic acid salt, wherein said calcium-containing substance contains either one of or both calcium hydroxide ($Ca(OH)_2$) and a calcium oxide (CaO), and the acid dissociation exponent (pKa) of any one of the organic acids or the organic acid salts ranges between 3 and 5.

As is true in a silica-based granular material, examples of silica-based powder or granular material used for the composition and generally comprised of silicon oxide ($SiO_2$) include silica fume, silica rock and calcined pearlite. These materials may desirably undergo a thermal treatment to enhance activity of silicon oxide contained therein. Foam-expanded calcined pearlite is particularly preferable because of its high potential for reaction. Silica fume in the state of generally spherical fine particles is also desirable, because it requires less water to be added and thus facilitates treatment operation. A silica-based powder or granular material used for the composition desirably has a particle diameter of not greater than 5.0 μm.

Examples of a calcium-containing substance that contains either one of or both calcium hydroxide ($Ca(OH)_2$) and calcium oxide (CaO) include calcium hydroxide, calcium oxide, and cement. Calcium hydroxide is particularly desirable, because it is easy to handle and adjust a mixing proportion.

Examples of organic acids and organic acid salts to be used as the aforementioned organic acid and organic acid salt having an acid dissociation exponent (pKa) ranging from 3 to 5 include gluconic acid, spiculisporic acid, lactic acid, acetic acid, propionic acid, arabic acid and the like, as well as salts of these acids (particularly calcium salt), each and every one of which has an acid dissociation exponent (pKa) ranging from 3 to 5. Any one of these acids or salts may be used singularly or as a mixture with other organic acids or their salts mentioned in this paragraph.

An organic acid or a salt of an organic acid having an acid dissociation exponent (pKa) of less than 3 tremendously slows down various reactions that follow application of the base treatment agent onto the base member, such as reaction of the agent with the calcium hydroxide ($Ca(OH)_2$) in the base member, reaction between the silica-based powder or granular material and the calcium-containing substance, and reaction for condensation polymerization to form a three-dimensional network structure. Such a delay in reaction tremendously increases the time required to form a coating film and reduces the operation efficiency. An acid dissociation exponent (pKa) exceeding 5 overly accelerates such reactions as reaction of the agent with the calcium hydroxide ($Ca(OH)_2$) in the base member, reaction between the silica-based powder or granular material and the calcium-containing substance, and reaction for condensation polymerization to form a three-dimensional network structure. Such an exceedingly fast reaction results in uneven, partial progress of reaction, which prevents formation of a uniform film. Another unfavorable result is substantial contraction action, which may produce cracks in the coating film or, in some cases, cause the agent to become powdered and peel, making the formation of the film entirely impossible. In order to prevent such problems, an organic acid or an organic acid salt whose acid dissociation exponent (pKa) ranges from 3 to 5 is used according to the invention.

A base treatment agent is produced as a slurry-like aqueous solution by mixing a silica-based powder or granular material; a calcium-containing substance having a weight ratio of 0.2 to 2 times that of the silica-based powder or granular material; at least one kind of organic acid or a salt of organic acid having a total weight ratio of 0.01 to 0.1 times the total weight ratio of the silica-based powder or granular material and the calcium-containing substance and selected from a group consisting of gluconic acid, spiculisporic acid, lactic acid, acetic acid, propionic acid and salts of these acids, each of which has an acid dissociation exponent (pKa) ranging from 3 to 5; arabic acid and/or a salt of arabic acid having a total weight ratio of 0.1 to 0.5 times the total weight ratio of the silica-based powder or granular material and the calcium-containing substance; and an appropriate quantity of water.

A calcium-containing substance having a weight ratio in terms of calcium hydroxide of less than 0.2 times the weight ratio of the silica-based powder or granular material does not have a sufficient ability to properly react with the silica-based granular material supported on the film of the polymeric emulsion or react with the polymeric emulsion and, therefore, makes it impossible to increase the strength of a film formed of the base treatment agent or the reactivity of the base treatment agent with the base reinforcing agent, or form a strong and properly integrated coating film within a short period of time. In cases where the weight ratio of the calcium-containing substance in terms of calcium hydroxide exceeds 2 times the weight ratio of the silica-based powder or granular material, relative decrease in weight ratio of the silica-based powder or granular material reduces foundation points for reaction and formation of a network structure so that the strength, weather resistance, water resistance and reactivity with the base reinforcing agent are reduced. This makes it impossible to obtain a satisfactory coating film, because such an agent is not only unable to form a smooth film or facilitate application operation but may also present the problem of efflorescence. In order to prevent these problems, it is desirable to limit the weight ratio of the calcium-containing substance in terms of calcium hydroxide in the range of 0.2 to 2 times that of the silica-based powder or granular material.

In cases where the weight ratio of the organic acid and the organic acid salt, which have been selected from a group consisting of gluconic acid, spiculisporic acid, lactic acid, acetic acid, propionic acid and salts of these acids, is less than 0.01 times the total weight ratio of the silica-based powder or granular material and the calcium-containing substance, the reactivity of the silica-based granular material supported by the polymeric water emulsion with the calcium-containing substance in the base treatment agent is reduced, while proper progress of various other reactions such as reaction of silica-based powder or granular material, reaction of the calcium-containing substance and condensation polymerization, is also impaired. As a result, it becomes impossible to give a coating film increased strength, water resistance, weather resistance or ability to permit materials to be thoroughly dispersed therein, and therefore, it becomes difficult to obtain a uniform, smooth film or increase the operation efficiency. In cases where the weight ratio of the organic acid and the organic acid salt that have been selected from a group consisting of gluconic acid, spiculisporic acid, lactic acid, acetic acid, propionic acid and salts of these acids exceeds 0.1 times the total weight ratio of the silica-based powder or granular material and the calcium-containing substance, unreacted organic acid and organic acid salt remain in a network structures, making it difficult to obtain satisfactory strength, weather resistance or water resistance, and also presenting the problem of cost increase. In order to prevent these problems, it is desirable to limit the weight ratio of the organic acid and the organic acid salt that have been selected from a group consisting of gluconic acid, spiculisporic acid, lactic acid, acetic acid, propionic acid and salts of these acids in the range of 0.01 to 0.1 times the total weight ratio of the silica-based powder or granular material and the calcium-containing substance.

Furthermore, in cases where the weight ratio of the arabic acid and the arabic acid salt is less than 0.1 times the total weight ratio of the silica-based powder or granular material and the calcium-containing substance, the reactivity of the silica-based granular material supported by the polymeric water emulsion with the calcium-containing substance in the base treatment agent is reduced, while proper progress of various other reactions such as reaction of silica-based powder or granular material, reaction of the calcium-containing substance and condensation polymerization, is also impaired. The weight ratio of the arabic acid and the arabic acid salt exceeding 5 times the total weight ratio of the silica-based powder or granular material and the calcium-containing substance causes unreacted organic acid and organic acid salt to remain in the network structure, making it difficult to obtain satisfactory strength, weather resistance or water resistance, and also presenting the problem of cost increase. In order to prevent these problems, it is desirable to limit the weight ratio of the arabic acid and the arabic acid salt in the range of 0.1 to 5 times the total weight ratio of the silica-based powder or granular material and the calcium-containing substance.

All of the above organic acids and organic acid salts are water soluble, mixed thoroughly with a silica-based powder or granular material and a calcium-containing substance, have surface activity effect, and are capable of suppressing formation of bubbles so that they can be mixed thoroughly and evenly dispersed in the mixture without increasing the viscosity of the mixture when mixed with a silica-based powder or granular material, a calcium-containing substance and other materials.

The base reinforcing agent mentioned above is a mixture generally comprised of an aqueous solution of an alkali silicate and either one of or both organic acid and organic acid salt having an acid dissociation exponent (pKa) ranging from 3 to 5.

Examples of alkali silicate used for the aforementioned alkali silicate solution include sodium silicate, lithium silicate, potassium silicate and so on, of which sodium silicate is preferable, because it is easily available and inexpensive. Because of its great resistance to water damage, lithium silicate is a preferable choice, in cases where great resistance to water is particularly required.

The molar ratio of silicon oxide ($SiO_2$) to the alkali ($M_2O$) in the alkali silicate mentioned above is preferably from 5 to 7.5, wherein M represents lithium (li), potassium (K), sodium (Na) or cesium (Cs). A molar ratio of the silicon oxide ($SiO_2$) to the alkali ($M_2O$) of less than 5 increases the relative quantity of alkali, thereby increasing the alkali supported and thus remaining in a network structure formed by chemical reaction resulting from application of the base reinforcing agent. Therefore, it becomes impossible to increase the strength, water resistance or the weather resistance of the base member. A molar ratio of the silicon oxide ($SiO_2$) to the alkali ($M_2O$) exceeding 7.5 overly enhances condensation polymerization reaction between silicon oxide molecules, often resulting in flocculation and powderization as well as increase in the viscosity of the agent, thereby reducing the reactivity with the base treatment agent and impairing structural integration and growth of network structure. Therefore, it is desirable to limit the molar ratio of silicon oxide ($SiO_2$) to the alkali ($M_2O$) in the range of 5 to 7.5.

The aforementioned aqueous solution of an alkali silicate is a 15 to 40% solution of an alkali silicate. In cases where the concentration of the aqueous solution of an alkali silicate is less than 15%, the absolute quantity of the alkali silicate is insufficient to properly react with a base treatment agent, and it is therefore necessary to increase the amount applied in order to attain a desired strength and resistance to weather and water damage. On the other hand, increasing the amount of the agent applied also increases the possibility of dripping or other undesirable problems. In order to prevent dripping or such problems, it is necessary to apply the agent in several layers. This, however, complicates application operation and may result in increase in costs. In addition, increase in the strength or resistance to weather or water damage cannot be expected, because residual alkali trapped and thus remaining in the three-dimensional network structure, too, increases. An alkali silicate solution having a concentration of more than 40% does not have a sufficient water content and may initiate bonding among alkali silicate molecules before application of the agent. As such a bond increases the viscosity of the agent and makes it difficult to obtain a smooth film, it presents the possibility of impairing the operation efficiency. Therefore, it is desirable to limit the concentration of the aqueous solution of alkali silicate in the range of 15 to 40%.

As is true in a base treatment agent, examples organic acids and organic acid salts to be used as the aforementioned organic acid and organic acid salt having an acid dissociation exponent (pKa) ranging from 3 to 5 include gluconic acid, spiculisporic acid, lactic acid, acetic acid, propionic acid, arabic acid and the like, as well as salts of these acids (particularly calcium salt), each and every one of which has an acid dissociation exponent (pKa) ranging from 3 to 5. Any one of these acids or salts may be used singularly or as a mixture with other organic acids or their salts mentioned in this paragraph.

When an organic acid or a salt of an organic acid used for the composition has an acid dissociation exponent (pKa) of less than 3, various reactions that follow the application of the base reinforcing agent onto the base treatment agent, such as reaction between the base reinforcing agent and the base treatment agent and inter-reaction among alkali silicate molecules, become extremely slow. Such a delay in reaction tremendously increases the time required to form a coating film and reduces the operation efficiency. An acid dissociation exponent (pKa) exceeding 5 excessively speeds up various reactions, such as reaction between the base reinforcing agent and the base treatment agent and reaction between the molecules of the alkali silicate and causes uneven, partial progress of reaction, which impairs formation of a uniform film. Another unfavorable result is substantial contraction action, which may form cracks in the coating film or, in some cases, cause the agent to become powdered and peel, making the formation of the film entirely impossible. In order to prevent such problems, organic acid and organic acid salt whose acid dissociation exponent (pKa) ranges from 3 to 5, are used according to the invention.

A base reinforcing agent is produced by mixing the aforementioned aqueous solution of an alkali silicate and organic acid and/or organic acid salt having an acid dissociation exponent (pKa) ranging from 3 to 5 at appropriate mixing proportions, wherein said organic acid and organic acid salt are comprised of at least one kind of organic acid or a salt of an organic acid selected from a group consisting of gluconic acid, spiculisporic acid, lactic acid, acetic acid, propionic acid and salts of these acids having a total weight ratio of 0.01 to 0.1 times the weight ratio the of the aqueous solution of the alkali silicate remaining after the weight of water has been subtracted, and either one of or both an arabic acid and a salt of arabic acid having a total weight ratio of 0.1 to 0.5 times the weight ratio of the alkali silicate solution remaining after the weight of water has been subtracted.

When the weight ratio of the organic acid and the salt of the organic acid that have been selected from a group consisting of gluconic acid, spiculisporic acid, lactic acid, acetic acid, propionic acid and salts of these acids is less than 0.01 times the weight ratio of the alkali silicate solution remaining after the weight of water has been subtracted, it impairs proper progress of reaction of the alkali silicate with the base treatment agent and reaction among alkali silicate molecules, making it impossible to attain such objectives as forming an integral body with the base treatment agent, increasing the strength, resistance to weather and water damage or dispersion of materials. As a result, it becomes difficult to obtain a virtually even, smooth coating film or increase the operation efficiency. On the other hand, in cases where the weight ratio of the organic acid and the organic acid salt that have been selected from a group consisting of gluconic acid, spiculisporic acid, lactic acid, acetic acid, propionic acid and salts of these acids exceeds 0.1 times the weight ratio of the alkali silicate solution remaining after the weight of water has been subtracted, unreacted organic acid and organic acid salt remain between network structures, making it difficult to obtain satisfactory strength, weather resistance or water resistance, and also presenting the problem of cost increase. In order to prevent these problems, it is desirable to limit the weight ratio of the organic acid and the organic acid salt that have been selected from a group consisting of gluconic acid, spiculisporic acid, lactic acid, acetic acid, propionic acid and salts of these acids in the range of 0.01 to 0.1 times the weight ratio of the alkali silicate solution remaining after the weight of water has been subtracted.

Furthermore, when the weight ratio of the arabic acid and the arabic acid salt is less than 0.1 times the weight ratio of the alkali silicate solution remaining after the weight of water has been subtracted, it impairs reaction between the alkali silicate and the base treatment agent as well as reaction between alkali silicate molecules, making it impossible to attain such objectives as forming an integral body with the base treatment agent, increasing the strength or the resistance to weather and water damage. On the other hand, in cases where the weight ratio of the arabic acid and the arabic acid salt exceeds 5 times the weight ratio of the alkali silicate solution remaining after the weight of water has been subtracted, unreacted organic acid and organic acid salt remain in the network structure, making it difficult to obtain satisfactory strength, weather resistance or water resistance, and also presenting the problem of cost increase. In order to prevent these problems, it is desirable to limit the weight ratio of the arabic acid and the arabic acid salt in the range of 0.1 to 5 times the weight ratio of the alkali silicate solution remaining after the weight of water has been subtracted.

All of the above organic acids and organic acid salts are mixed thoroughly with an aqueous solution of an alkali silicate without the potential of forming bubbles or increasing the viscosity of the agent.

Next, the function of the first embodiment described above is explained hereunder.

Firstly, the polymeric water emulsion in the state of a liquid is sprayed or applied with a brush, roller or the like onto a base member in the manner of a thin film having a thickness ranging from 200 to 1000 $\mu$m. At that time, it is desirable to limit the thickness of the coating film in the range of 200 to 1000, because a film thinner than 200 $\mu$m not only impairs tight adhesion of the emulsion to the base member but also reduces its ability to support the silica-based granular powder as described later, thereby necessitating application of the emulsion in several layers and reducing the operation efficiency, while a film thicker than 1000 $\mu$m presents the potential of peeling off resulting from external impact or stress.

Next, before the polymeric water emulsion becomes sufficiently solid, the silica-based granular material is placed on the film of the polymeric water emulsion so as to be supported thereon. To be more specific, the silica-based powder-granular material is sprayed by means of a sand blaster or otherwise applied onto the film of the polymeric water emulsion so that the silica-based granular material is embedded in and thus supported on the film of the polymeric water emulsion in such a state that at least a part of the silica-based granular material is exposed from the film without being wet from the polymeric water emulsion. In cases where the silica-based granular material is applied by means of spraying onto the film of the polymeric water emulsion, the injection pressure is adjusted so that the silica-based granular material is supported in such a state that at least a part of the silica-based granular material is exposed. For example, in cases where silica powder having an average particle diameter of 5.0 $\mu$m is used as the silica-based powder-granular material, the silica powder is injected at a pressure of 5 kg/cm$^2$.

The base treatment agent, which has been produced by mixing materials beforehand, is applied onto the surface of a coating film on which the silica-based granular material is secured by use of the great adhesive strength of the polymeric water emulsion. To be more precise, approximately 5 to 10 kg/m$^2$ of the agent is applied by spraying or with a brush, a roller or the like, thereby forming a coating film having a thickness of 2.5 to 5.0 $\mu$m in such a manner as to cover the exposed part of the silica-based granular material, and thus formed coating film is then let dry. At that time, it is desirable to limit the amount applied in the range of 5 to 10 kg/m$^2$ (a film thickness in the range of 2.5 to 5.0 $\mu$m), because a film thinner than 2.5 $\mu$m (less than 5 kg/m$^2$) does not have sufficient strength, while a film thicker than 5.0 $\mu$m (more than 10 kg/m$^2$) presents the potential of peeling off.

When the water content in the mixture consisting of the silica-based powder or granular material, the calcium-containing substance, the organic acids and/or the salts of organic acids, and water, is reduced to a certain level due to vaporization of moisture occurring after the application of the base treatment agent, factors such as the surface activity effect of the organic acid and the organic acid salt having an acid dissociation exponent (pKa) ranging from 3 to 5 initiate pozzolanic reaction of the exposed part of the silica-based granular material, which is supported on the film of the polymeric emulsion as above, and the silica-based powder or granular material contained in the base treatment agent with calcium hydroxide in the calcium-containing substance and also with calcium hydroxide generated as a result of combination of the calcium oxide with the water. As a result of the pozzolanic reaction, CaO—SiO— ... —SiO— ... —SiO—CaO (C—O—S—O—C), which is an insoluble chain compound, and calcium silicate are generated. Meanwhile, as a result of reaction between the silica-based powder or granular material in the base treatment agent and the silica-based granular material and inter-reaction among silicone oxide molecules contained in the silica-based granular material, hydrogen bonding and dehydro-condensation of silicone oxide molecules produce Si—O—Si bonds, thereby forming an intertwined three-dimensional network structure.

In cases where porous pearlite powder or similar material is used as the silica-based granular material, various abilities of the organic acids and the salts of organic acids, such as surface activity effect, permeability and dispersibility, permit the silica-based powder or granular material and the calcium-containing substance to permeate into the pores of the pearlite powder and undergo reaction therein.

When the thin, film-like coating of the base treatment agent is completely dry, a part of the calcium hydroxide is enveloped and supported in the three-dimensional network structure without undergoing reaction when the three-dimensional network structure was formed so that a plurality of hydroxyl groups (—OH) remain in the network structure.

A base reinforcing agent is then applied onto the surface of the coating film of the base treatment agent and let dry. Like the base treatment agent, the base reinforcing agent may be applied by any appropriate means. The quantity of the base reinforcing agent containing 15 to 30% solids to be applied each time is limited in the range of about 5 to 10 m$^2$/kg so as to form a film having a thickness ranging from 3.5 to 7 $\mu$m. At that time, it is desirable to limit the amount applied in the range of 5 to 10 m$^2$/kg (a film thickness in the range of 3.5 to 7 $\mu$m), because a film thinner than 3.5 $\mu$m (less than 5 kg/m$^2$) does not have sufficient strength, while a film thicker than 7 $\mu$m (more than 10 kg/m$^2$) presents the potential of peeling off and also increases costs due to excessive and wasteful consumption of the agent.

Effects of application of the base reinforcing agent are as follows: as a result of decrease in the water content due to vaporization of moisture occurring after the application of the agent, such factors as catalytic action of the organic acid and/or the organic acid salt having an acid dissociation exponent (pKa) ranging from 3 to 5 and the like cause the alkali silicate in the base reinforcing agent to react with calcium hydroxide and silicone oxide supported in the network structure of the base treatment agent and generates water-resistant and weather resistant calcium silicate and insoluble C—O—S—O—C. The alkali silicate also grows the network structure by means of reaction with hydroxyl groups in the base treatment agent, as well as C—O—S—O—C bonds and Si—O—Si bonds that constitute a network structure in the agent, while Si—O—Si bonds are formed by inter-reaction among alkali silicate molecules and grow the network structure even further. Yet another function of the alkali silicate is to grow the network structure by means of reaction with silicone oxide that has remained unreacted in the silica-based powder or granular material in the coating film of the base treatment agent. Furthermore, as the alkali silicate also reacts so as to be interposed between silicon oxide molecules that have remained unreacted, the density of the network structure is increased. As a result of these reactions, the base reinforcing agent becomes integrated with the base treatment agent and constitutes a complex three-dimensional network structure having a sufficient structural density.

As described above, the operation efficiency is increased in that a smooth and virtually uniform coating film which has great strength and resistance to water and weather damage and is comprised of coating films of the respective agents that are integrated into a single body can be formed easily and quickly regardless of the type of base member.

Furthermore, as the invention is capable of forming an inorganic coating film in a strong, integrally body, the invention is also capable of giving a base member both heat resistance and acid resistance.

Either one of or both the base treatment agent and the base reinforcing agent of a surface treatment agent according to the first embodiment described above may contain a pigment.

Examples of pigments mentioned above include various inorganic pigments, such as zinc yellow, red lead, chrome yellow, cadmium red, cadmium yellow, cobalt blue, viridian, white lead, ultramarine, titanium oxide, black iron oxide, red iron oxide, alumina white, titanium black, lithopone and carbon black, and organic pigments, such as alizarin lake, indanthrene blue, eosine lake, quinacridone red, quinacridone violet, copper phthalocyanine type pigments, naphthol green and diamond black. Regardless of whether it is a natural pigment or a synthetic product, any pigment may be used. An inorganic pigment which is both alkali resistant and weather resistant is particularly desirable.

In cases where a base treatment agent contains a pigment, the pigment is secured in such a manner as to be enveloped and supported in the network structure and between molecules of calcium silicate (CaSiO$_3$) that have been generated. Therefore, regardless of the type of base member, the base member can be coated with a strong inorganic color coating film without the potential of the pigment peeling off or being otherwise removed from the surface of the base member. As a result, the base member is colored well and evenly, while the range of its usage is expanded, because coloring the base member improves it from an aesthetic point of view and also makes it easy to differentiate. In cases where a base treatment agent containing a pigment is used, a pigment having a particle diameter of not more than 0.5 $\mu$m is desirable, because of such a fine powder allows to be supported in a network structure in satisfactory conditions.

When the base reinforcing agent containing a pigment reacts with the base treatment agent, regardless of the type of base member, pigment is securely supported in the network structure so that a strong coating film can be formed without the potential of the pigment peeling off or being otherwise removed from the surface of the base member. Therefore, the base is colored well and virtually evenly, while the range of its usage is expanded, because coloring the inorganic material improves it from an aesthetic point of view and also makes it easy to differentiate. For the same reason as that for a pigment contained in a base treatment agent, a pigment contained in a base reinforcing agent, too, may desirably have a particle diameter of not more than 0.5 $\mu$m in order to ensure the pigment to be supported and secured by the network structure in good conditions.

Using a base treatment agent and a base reinforcing agent respectively containing pigments provides a surface treatment agent having a superior coloring capability as it enables the complicated coloring as well as gradation coloring, thereby improving a base member to be treated even further from an aesthetic point of view and also making it easier to differentiate.

As described above, regardless of the type of base member to be treated, a surface treatment agent containing a pigment or pigments ensures the pigment(s) to be reliably supported without the potential of the pigment(s) peeling off or being otherwise removed from the surface of the base member, and is capable of coloring the base member well and virtually evenly, thereby improving it from an aesthetic point of view, making it easy to differentiate and consequently expanding the range of usage of the base member.

Either one of or both the base treatment agent and the base reinforcing agent described above may contain metal oxide, such as zinc oxide, aluminum oxide, titanium oxide, magnesium oxide, etc. Silicon oxide is particularly preferable because of its high reactivity.

In cases where a base treatment agent contains metal oxide, its weight ratio has to be in the range of 0.1 to 5 times the total weight ratio of the silica-based powder or granular material and the calcium-containing substance. In cases where a base reinforcing agent contains metal oxide, its weight ratio has to be in the range of 0.1 to 5 times the weight ratio of the aqueous solution of alkali silicate remaining after the weight of water has been subtracted. Metal oxide whose weight ratio is less than 0.1 times the total weight ratio of the silica-based powder or granular material and the calcium-containing substance or the weight ratio of the alkali silicate solution remaining after the weight of water has been subtracted reduces bridging bonds between the chain compounds of the Si—O—Si bonds in the network structure so that further increase in the strength, weather resistance or water resistance cannot be attained. In cases where the metal oxide has a weight ratio exceeding 5 times the total weight ratio of the silica-based powder or granular material and the calcium-containing substance or the weight ratio of the alkali silicate solution remaining after the weight of water has been subtracted, a part of the metal oxide is not involved in linking the chain compounds and remains in the network structure. Such excessive metal oxide not only makes it impossible to attain such objectives as increases in the strength, weather resistance or water resistance of the treated material but also causes the color of the metal oxide to tint the coating film, thereby impairing satisfactory coloring and increasing costs. In order to prevent these problems, it is desirable to limit the weight ratio of the metal oxide used in the range of 0.1 to 5 times the total weight ratio of the silica-based powder or granular material and the calcium-containing substance or the weight ratio of the aqueous solution of alkali silicate remaining after the weight of water has been subtracted.

Inclusion of metal oxide further increases the structure density of the network structure, because the metal oxide rapidly enters between the chain compounds of the Si—O—Si bonds in the network structure and connects them by way of Si—O—M—O—Si bonds, wherein M represents the metal.

As described above, inclusion of metal oxide has such a benefit as further increasing the structure density of the already dense network structure, and also increasing the strength and resistance to weather and water damage of the material.

A base reinforcing agent may contain porous, amorphous silica-based powder. Examples of the silica-based powder mentioned above include pearlite powder, diatomaceous earth, silica gel powder, mica, etc., of which calcined pearlite powder is particularly preferable.

As a result of inclusion of porous, amorphous silica-based powder, the porous, amorphous silica-based powder reacts with calcium hydroxide and silicone oxide that have remained in the unreacted state, thereby generating calcium silicate, C—O—S—O—C and Si—O—Si bonds and thus growing a dense, three-dimensional network structure, while limiting contraction that otherwise occurs when the network structure is formed and thus preventing formation of small cracks on the surface of the coating film. Therefore, a good, thin coating film which is smoother and lustrous can be obtained.

When using porous, amorphous silica-based powder, it is desirable to limit the weight ratio of the porous, amorphous silica-based powder in the range of 1.0 to 15 times the weight ratio of the alkali silicate solution remaining after the weight of water has been subtracted. When the weight ratio of the porous, amorphous silica-based powder is less than 1.0 times the weight ratio of the alkali silicate solution remaining after the weight of water has been subtracted, the film cannot be made smoother, because it is impossible to limit contraction and therefore impossible to prevent cracks. The porous, amorphous silica-based powder exceeding 15 times the weight ratio of the alkali silicate solution remaining after the weight of water has been subtracted increase the viscosity of the agent, which is not only inconvenient to conduct operation of forming a coating film but also increases the thickness of a coating film and consequently increasing costs. In order to prevent these problems, the weight ratio of the porous, amorphous silica-based powder is limited in the range of 1.0 to 15 times the weight ratio of the alkali silicate solution remaining after the weight of water has been subtracted.

Next, another embodiment of the present invention, which is referred to the second embodiment hereinafter, is explained hereunder.

The agent according to the second embodiment is a four-liquid one-powder coloring type agent comprised of a coloring agent in addition to a three-liquid one-powder type agent according to the first embodiment described above.

In other words, the agent is a four-liquid one-powder coloring type agent comprised of a polymeric water emulsion, a silica-based granular material, a base treatment agent and a base reinforcing agent according to the first embodiment described above and, in addition to these four ingredients, a coloring agent to be applied onto a coating film of the base reinforcing agent.

The coloring agent mentioned above is a liquid mixture generally comprised of a silica-based solution (an aqueous solution), a pigment, and either one of or both organic acid and organic acid salt, wherein the acid dissociation exponent (pKa) of any one of the organic acids or the organic acid salts used ranges from 3 to 5.

In the same manner as a base reinforcing agent, the aqueous solution of an alkali silicate may desirably be a 15 to 40% solution of an alkali silicate, of which the molar ratio of silicon oxide ($SiO_2$) to the alkali ($M_2O$) is limited in the range of 5 to 7.5. Criteria for use of organic acids and organic acid salts salt having an acid dissociation exponent (pKa) ranging from 3 to 5 are also the same as those for a base reinforcing agent: it is desirable that a mixture of at least one of acids and their salts having a weight ratio ranging from 0.01 to 0.1 times the weight ratio of the alkali silicate solution remaining after the weight of water has been subtracted and selected from among gluconic acid, spiculisporic acid, lactic acid, acetic acid, propionic acid and salts of these acids, and either one of or both arabic acid and a salt of arabic acid having a total weight ratio ranging from 0.1 to 5 times the weight ratio of the alkali silicate solution remaining after the weight of water has been subtracted.

As described above, any pigment can be used regardless of whether it is an organic pigment or an inorganic pigment or whether it is a natural pigment or a synthetic product. However, for this embodiment, too, an inorganic pigment which is both alkali resistant and weather resistant is preferable.

Approximately 5 to 10 $m^2$/kg of coloring agent having the composition described above is sprayed or applied with a brush, a roller or the like onto the surface of a coating film of a base reinforcing agent so as to form a coating film having a thickness ranging from 10 to 40 $\mu$m, and the coating film is then let dry. By repeating such an application process, the thickness of the color coating film can be increased.

Application of the coloring agent onto the surface of a base reinforcing agent, which has been applied in the manner of a thin film and integrated with a base treatment agent into a dense body by means of a network structure, initiates a catalytic action of the organic acid and the organic acid salt having an acid dissociation exponent (pKa) ranging from 3 to 5 so that the alkali silicate is bonded with hydroxyl groups (—OH) in the base reinforcing agents and also with C—O—S—O—C bonds and Si—O—Si bonds, which constitute a network structure, and alkali silicate molecules themselves are bonded together. As a result, a three-dimensional dense network structure grows with the alkali in the alkali silicate and the coloring agent secured in such a manner as to be enveloped in the network structure and becomes integrated with the film of the reinforcing agent. Thus, a colored coating film having a dense, complex network structure in which a pigment is enveloped is formed.

Therefore, regardless of the type of base member, the invention is capable of coloring a base member well and easily in a short period of time and giving the base member great strength and resistance to weather and water damage, while expanding the range of usage of the base member by coloring the member so as to improve it from an aesthetic point of view and also make it easy to differentiate.

Furthermore, by forming an inorganic coating film on the surface of the base member, the invention is capable of giving the base member both heat resistance and acid resistance.

Depending on manners of application of a coloring agent, it is possible to color a material in a distinguishable way so that the colored material can be used as a division marker or a wall painting. Thus, a surface treatment agent according to the second embodiment expands the range of usage of the material to which it is applied.

In the same manner as the first embodiment, either one of or both base reinforcing agent and a coloring agent may contain porous, amorphous silica-based powder, such as pearlite powder, diatomaceous earth, silica gel powder, mica, etc.

As a result of inclusion of porous, amorphous silica-based powder, the porous, amorphous silica-based powder reacts with calcium hydroxide and silicone oxide that have remained in the unreacted state, thereby generating calcium silicate, C—O—S—O—C and Si—O—Si bonds and thus growing a dense, three-dimensional network structure, while limiting contraction that otherwise occurs when the network structure is formed and thus preventing formation of small cracks on the surface of the coating film. Therefore, a good, thin coating film which is smoother and lustrous can be obtained.

As explained above, it is desirable to limit the weight ratio of the porous, amorphous silica-based powder in the range of 1.0 to 15 times the weight ratio of the alkali silicate solution remaining after the weight of water has been subtracted.

Next, explained hereunder is an experimental treatment of the surface of a base member according to the invention described above, wherein metal plates made of aluminum and polluted concrete were used as the base member to be treated.

Firstly, a polymeric water emulsion having a solid content of 20% was produced by adding water to an acryl-styrene copolymer emulsion having a solid content of 50% with a mixing of 150 cc water to 100 cc of acryl-styrene copolymer emulsion. 5 to 10 kg/$m^2$ of thus produced polymeric water emulsion was applied with a brush onto the surface of aluminum plates and polluted concrete.

Sample pieces of concrete were polluted by soaking the concrete samples with the aforementioned acryl-styrene copolymer resin in the atmosphere at 25° C. and 65% humidity. Each sample piece of concrete was produced by forming a piece having dimensions of 20 cm×20 cm×3 cm according to the proportions shown in Table 1, placing the piece in the moist atmosphere at 25° C. for two days, submerging it in water at 20° C. for seven days and then drying and curing them in a room at 25° C. and 65% RH.

TABLE 1

| Raw Material | Quantity (Kg/$m^3$) |
| --- | --- |
| Unit cement* | 180 |
| Calcium carbonate | 120 |
| Fine aggregate | 803 |
| Coarse aggregate | 944 |
| Water | 195 |
| Slump (cm) | 21 |

*Unit cement = a quantity of cement necessary to produce 1 $m^3$ of concrete

Next, immediately after application of the polymeric water emulsion, the silica-based granular material, i.e. silica particles having an average diameter of 0.5 mm, was injected with a sand blaster onto the surface of the coating film of polymeric water emulsion of each sample at an injection pressure of approximately 5 kg/$cm^2$. As a result of this injection of the silica particles, they are supported in such a state that the silica particles were half buried in and half exposed from the film of polymeric water emulsion. Then, each sample was dried at ordinary temperature in ordinary atmospheric environment (25° C. and 50% humidity) until the polymeric water emulsion became solid.

Thereafter, base treatment agents shown in Table 2 were produced by mixing various raw materials in appropriate proportions, and 5 to 10 kg/$m^2$ of each treatment agent was applied with a brush onto the surface of the coating film of polymeric water emulsion of a sample so as to cover the silica particles exposed from the film of polymeric water emulsion. Each sample was then dried at ordinary temperature in ordinary atmospheric environment (25° C. and 50% humidity).

The calcium-containing substance used consisted of calcium oxide and Portland cement. The silica-based powder or granular material used consisted of pearlite powder having a particle diameter ranging from 0.5 to 5.0 μm and silica rock particles having a particle diameter ranging from 0.5 to 3.0 μm. Furthermore, zinc oxide was used as the metal oxide.

The tests were conducted to evaluate the strength, water resistance, reactivity with concrete and ease of operation of the coating film of each sample. The evaluation of each characteristic was conducted based on four categories shown in Table 3. The results are shown in Table 4.

TABLE 2

| | Item | No. 1 | 2 | 3 | 4 | 5 | 6 | 3 | 7 | 8 |
|---|---|---|---|---|---|---|---|---|---|---|
| ① | A | 1.0 | 2.0 | 3.0 | 4.0 | 5.0 | 6.0 | 3.0 | 3.0 | 3.0 |
| | B | 2.0 | 4.0 | 6.0 | 8.0 | 10.0 | 12.0 | 6.0 | 6.0 | 6.0 |
| | C | 21.0 | 18.0 | 15.0 | 12.0 | 9.0 | 6.0 | 15.0 | — | — |
| | D | — | — | — | — | — | — | — | 15.0 | — |
| | E | — | — | — | — | — | — | — | — | 15.0 |
| | F | 1.0 | 1.0 | 1.0 | 1.0 | 1.0 | 1.0 | 1.0 | 1.0 | 1.0 |
| G | | 25.0 | 25.0 | 25.0 | 25.0 | 25.0 | 25.0 | 25.0 | 25.0 | 25.0 |
| ② | H | 0.025 | 0.025 | 0.025 | 0.025 | 0.025 | 0.025 | 0.025 | 0.025 | 0.025 |
| | I | — | — | — | — | — | — | — | — | — |
| | J | — | — | — | — | — | — | — | — | — |
| | K | 0.25 | 0.25 | 0.25 | 0.25 | 0.25 | 0.25 | 0.25 | 0.25 | 0.25 |
| | L | 100.0 | 100.0 | 100.0 | 100.0 | 100.0 | 100.0 | 100.0 | 100.0 | 100.0 |

| | Item | No. 9 | 10 | 11 | 12 | 9 | 13 | 14 | 15 |
|---|---|---|---|---|---|---|---|---|---|
| ① | A | 3.0 | 3.0 | 3.0 | 3.0 | 3.0 | 3.0 | 3.0 | 3.0 |
| | B | 6.0 | 6.0 | 6.0 | 6.0 | 6.0 | 6.0 | 6.0 | 6.0 |
| | C | 7.5 | 5.0 | 7.5 | 7.5 | 7.5 | 7.5 | 7.5 | 7.5 |
| | D | 7.5 | 5.0 | 7.5 | 7.5 | 7.5 | 7.5 | 7.5 | 7.5 |
| | E | — | 5.0 | — | — | — | — | — | — |
| | F | 1.0 | 1.0 | 1.0 | 1.0 | 1.0 | 1.0 | 1.0 | 1.0 |
| G | | 25.0 | 25.0 | 25.0 | 25.0 | 25.0 | 25.0 | 25.0 | 25.0 |
| ② | H | 0.025 | 0.025 | 0.00025 | 0.0025 | 0.025 | 0.25 | — | — |
| | I | — | — | — | — | — | — | 0.25 | — |
| | J | — | — | — | — | — | — | — | 0.25 |
| | K | 0.25 | 0.25 | 0.25 | 0.25 | 0.25 | 1.25 | 1.25 | 1.25 |
| | L | 100.0 | 100.0 | 100.0 | 100.0 | 100.0 | 100.0 | 100.0 | 100.0 |

①: Inorganic ingredient;
②: Catalytic ingredient
A: Calcium oxide; B: Cement; C: Pearlite powder; D: Silica fume; E: Silica rock; F: Zinc oxide; G: Total amount of the inorganic ingredients; H: Spiculisporic acid and calcium salt; I: Gluconic acid and calcium salt; J: Propionic acid and calcium salt; K: Arabic acid and calcium salt; L: Water

TABLE 3

| Evaluation Criteria | Smoothness | Strength | Water Resistance | Reactivity | Ease of Operation |
|---|---|---|---|---|---|
| ⊚ | No craters on the surface | No scars when scratched with a 100-yen coin | Does not dissolve if rubbed after submerged in water | Set to touch within 30 minutes | Very smooth |
| ○ | No conspicuous craters on the surface | No scars when scratched with a 10-yen coin | Does not dissolve after submerged in water | Set to touch within 60 minutes | Smooth |
| Δ | A few protrusions and indentation | Slightly scarred when scratched with a 10-yen coin | Becomes slightly slimy after submerged in water | Set to touch within 2 hours | Operation interrupted by stand-by periods |
| x | Bumpy and having craters | Scarred when scratched with a 10-yen coin | Dissolves in water | Not solid enough to touch even after 2 hours | Smooth, but unevenly coated |

TABLE 4

| Criteria | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Smoothness | ⊚ | ⊚ | ⊚ | ⊚ | ○ | ○ | ○ | ○ | ⊚ | ⊚ | ⊚ | ○ | ⊚ | ⊚ | ⊚ |
| Strength | X | ⊚ | ⊚ | ⊚ | ○ | X | ⊚ | ⊚ | ⊚ | ⊚ | ⊚ | ○ | ⊚ | ⊚ | ⊚ |
| Water Resistance | ○ | ⊚ | ⊚ | ⊚ | ○ | X | ⊚ | ⊚ | ⊚ | ⊚ | ○ | X | ⊚ | ⊚ | ⊚ |
| Reactivity | △ | ⊚ | ⊚ | ⊚ | ○ | X | ⊚ | ○ | ⊚ | ⊚ | ○ | X | ⊚ | ⊚ | ⊚ |
| Ease of Operation | ○ | ⊚ | ⊚ | ⊚ | ○ | X | ⊚ | ○ | ⊚ | ○ | X | ○ | ⊚ | ⊚ | ⊚ |

As is seen from the above results in Table 4, Composition Nos. 2–5, each of which contained a calcium-containing substance comprised of calcium compounds, i.e. calcium hydroxide and calcium oxide, having a total weight ratio in terms of calcium hydroxide ranging from 0.2 to 2 times that of the silica-based powder or granular material was not only easy to conduct application operation but also showed high reactivity: a strong, smooth coating film which had great resistance to water and was solid enough to touch was formed on the concrete 30 minutes after the application of the agent. Composition Nos. 2–4 showed particularly satisfactory results. Composition No. 1, which contained a calcium-containing substance at a weight ratio in terms of calcium hydroxide of less than 0.2 times that of the silica-based powder or granular material, was also easy to conduct application operation and produced a smooth coating film. On the other hand, it presented drawbacks such that the strength of the film was insufficient and that it took a considerable time to conduct application operation due to its poor reactivity with concrete: it took approximately two hours to dry.

From the results described above, it is evidently necessary to limit the weight ratio of a calcium-containing substance in terms of calcium hydroxide within the range of 0.2 to 2 times that of the silica-based powder or granular material.

Tests were conducted by varying the kind of the silica-based powder or granular material used, according to the same mixing proportions as Sample 3, because Sample 3 showed the best result. As is seen from the results, using pearlite powder resulted in showed the best result. As is seen from the results, using pearlite powder resulted in further increase in the smoothness, reactivity and working efficiency. However, Composition No. 9 which used silica fume in combination with pearlite powder produced the best coating film, reducing the moisture content even further.

Tests were conducted by varying the ratio of the organic acids and/or the organic acid salts used while maintaining the same mixing proportions of the other ingredients as those of Composition No. 9. Composition Nos. 9 and 13, each of which contained spiculisporic acid and its calcium salt at a weight ratio ranging from 0.01 to 0.1 times the total weight ratio of the silica-based powder or granular material and the calcium-containing substance and arabic acid and its salt at a weight ratio ranging from 0.1 to 5 times the total weight ratio of the silica-based powder or granular material and the calcium-containing substance, produced good coating films.

Composition No. 14, which used gluconic acid and its calcium salt having an acid dissociation exponent (pKa) ranging from 3 to 5 in place of the spiculisporic acid and its calcium salt used in Composition No. 13, and Composition No. 15, which used propionic acid and its calcium salt having an acid dissociation exponent (pKa) ranging from 3 to 5 in place of the spiculisporic acid and its calcium salt of Composition No. 13, also provided good coating films.

Furthermore, tests conducted by varying weight ratio of zinc oxide proved that a good coating film can be obtained when the weight ratio of the zinc oxide to the total solids content is in the range from 1:25 to 5:25.

Next, tests were conducted to examine a base reinforcing agent to evaluate the strength of the coating film, water resistance, reactivity with concrete and operation efficiency of each sample. A base treatment agent having the same composition as Composition No. 9, which showed the best result, was used for these test and applied with a brush onto concrete.

For the base reinforcing agent used for these tests, 20% alkali silicate solutions having various $SiO_2/Na_2O$ molar ratios were prepared. Each solution was produced by mixing 30% aqueous solution of sodium silicate having the $SiO_2/Na_2O$ ratio of 4.0, 40% aqueous solution of methyl amine-containing sodium silicate having the $SiO_2/Na_2O$ ratio of 4.0 and purified water (ion-exchange water) according to the proportions shown in Table 5. Each sample of base reinforcing agent containing said 20% alkali silicate solution and other ingredients according to the proportions shown in Table 6 was then by applied with a brush and a roller onto the surface of the base treatment agent of each respective sample piece. The results are shown in Table 7.

TABLE 5

| | | | | | |
|---|---|---|---|---|---|
| $SnO_2/Na_2O$ molar ratio of 20% alkali silicate solution | 4.0 | 5.0 | 6.0 | 7.5 | 9.0 |
| 30% sodium silicate having molar ratio of 4.0 | 100 | 100 | 100 | 100 | 100 |
| 40% methyl amine-containing silicate with 4.0 molar ratio | — | 18 | 36 | 63 | 90 |
| Purified water | 50 | 67 | 74 | 117 | 164 |

TABLE 6

| Ingredient | | Sample No. | | | | | | | | | |
|---|---|---|---|---|---|---|---|---|---|---|---|
| | | 21 | 22 | 23 | 24 | 25 | 26 | 27 | 28 | 29 | 30 |
| | | | | | | Molar ratio | | | | | |
| | | 4.0 | | 5.0 | | 6.0 | | 7.5 | | 9.0 | |
| A | C | 100.0 | 100.0 | 100.0 | 100.0 | 100.0 | 100.0 | 100.0 | 100.0 | 100.0 | 100.0 |
| | D | 1.0 | 1.0 | 1.0 | 1.0 | 1.0 | 1.0 | 1.0 | 1.0 | 1.0 | 1.0 |
| B | E | 0.005 | 0.05 | 0.005 | 0.05 | 0.005 | 0.05 | 0.005 | 0.05 | 0.005 | 0.05 |
| | F | 0.005 | 0.05 | 0.005 | 0.05 | 0.005 | 0.05 | 0.005 | 0.05 | 0.005 | 0.05 |
| | G | 0.05 | 2.5 | 0.05 | 2.5 | 0.05 | 2.5 | 0.05 | 2.5 | 0.05 | 2.5 |
| | H | 0.05 | 2.5 | 0.05 | 2.5 | 0.05 | 2.5 | 0.05 | 2.5 | 0.05 | 2.5 |

A: Silicate-based ingredient; B: Catalytic ingredient C: 20% sodium silicate aqueous solution; D: Zinc oxide; E: Spiculisporic acid; F: Calcium spiculisporate; G: Arabic acid; H: Calcium arabate

TABLE 7

| Criteria | No. | | | | | | | | | |
|---|---|---|---|---|---|---|---|---|---|---|
| | 21 | 22 | 23 | 24 | 25 | 26 | 27 | 28 | 29 | 30 |
| Strength | ◯ | ◯ | ◯ | ⊚ | ⊚ | ⊚ | ⊚ | ⊚ | ◯ | ◯ |
| Water Resistance | X | ◯ | ◯ | ⊚ | ⊚ | ⊚ | ⊚ | ⊚ | ◯ | X |
| Reactivity | X | ◯ | ◯ | ⊚ | ⊚ | ⊚ | ⊚ | ⊚ | ◯ | X |
| Ease of Operation | ◯ | ◯ | ◯ | ⊚ | ⊚ | ⊚ | ⊚ | ⊚ | ◯ | ◯ |

As is seen from the above results in Table 7, of Composition Nos. 23–28, each of which had a $SiO_2/Na_2O$ ratio in the range of 5.0 to 7.5, Composition Nos. 24–28, each of which contained an organic acid and a salt of an organic acid, i.e. spiculisporic acid and its calcium salt, at a weight ratio ranging from 0.01 to 0.1 times the weight ratio of the alkali silicate solution remaining after the weight of water has been subtracted and arabic acid and its salt at a weight ratio ranging from 0.1 to 5 times the weight ratio of the alkali silicate solution remaining after the weight of water has been subtracted, produced good coating films. Of the samples having a $SiO_2/Na_2O$ ratio of 4.0, Composition No. 22 having a greater proportion of organic acids and salts of organic acids showed particularly satisfactory results. Of the samples having a $SiO_2/Na_2O$ ratio of 9.0, Composition No. 29 having a relatively small proportion of organic acids and salts of organic acids showed superior results. The above result suggests that condensation polymerization reaction among silicon oxide molecules progresses rapidly in a composition containing silicon oxide in a great ratio so that catalytic action of organic acids and salts of organic acids is not apparent.

Furthermore, results of tests involving zinc oxide used as the metal oxide have proved that a particularly good coating film can be obtained when the ratio of zinc oxide is in the range of 1.0 to 5.0 times the weight ratio of an aqueous solution of sodium silicate remaining after the weight of water has been subtracted.

Next, a coloring agent was examined according to the same manner as above. 20% alkali silicate solutions having various $SiO_2/Na_2O$ molar ratios were used as alkali silicates for these tests. Each solution was produced by mixing 30% aqueous solution of sodium silicate having a $SiO_2/Na_2O$ ratio of 4.0, 40% aqueous solution of methyl amine-containing sodium silicate having a $SiO_2.Na_2O$ ratio of 4.0, and purified water (ion-exchange water) according to the proportions shown in Table 8. Red iron oxide was used as the pigment. Pearlite powder having a particle diameter ranging from 0.5 μm to 5 μm was mixed in each composition as porous, amorphous silica-based powder that served as a surface smoothing agent. A base treatment agent having the same composition as Composition No. 9, which had shown the best result, was used for these test and applied onto concrete with a brush. A base reinforcing agent having the same composition as Composition No. 24, which had shown the best result, was used for these test and likewise applied onto the surface of the base treatment agent of each respective sample piece. Each sample of coloring agent containing various ingredients according to the proportions shown in Table 9 was then applied with a brush and a roller onto the surface of the base reinforcing agent of each respective sample piece. The evaluation of the samples was conducted based on three levels shown in Tables 3 and 10. The results are shown in Table 11.

TABLE 8

| | | | | |
|---|---|---|---|---|
| $SnO_2/Na_2O$ molar ratio of 20% alkali silicate solution | 4.0 | 5.0 | 7.5 | 9.0 |
| 30% sodium silicate having molar ratio of 4.0 | 100 | 100 | 100 | 100 |
| 40% methyl amine-containing silicate with 4.0 molar ratio | — | 18 | 63 | 90 |
| Purified water | 50 | 67 | 117 | 164 |

TABLE 9

| | | ② | | | | | | | | |
|---|---|---|---|---|---|---|---|---|---|---|
| | | 31 | 32 | 33 | 34 | 35 | 36 | 37 | 38 | 39 |
| | | | | | | ③ | | | | |
| ① | | 4.0 | | | | 5.0 | | | 7.5 | |
| A | D | 100.0 | 100.0 | 100.0 | 100.0 | 100.0 | 100.0 | 100.0 | 100.0 | 100.0 |
| | E | 1 | 3 | 10 | 1 | 3 | 10 | 1 | 3 | 10 |
| | F | — | — | — | — | — | — | — | — | — |

TABLE 9-continued

| | | | | | | | | | | |
|---|---|---|---|---|---|---|---|---|---|---|
| B | H | — | — | 1.0 | 1.0 | 15.0 | 5.0 | 1.0 | 15.0 | 5.0 |
|   | I | — | — | — | — | — | — | — | — | — |
| C | J | 0.005 | 0.05 | 0.5 | 0.05 | 0.005 | 0.05 | 0.05 | 0.005 | 0.05 |
|   | K | 0.005 | 0.05 | 0.5 | 0.05 | 0.005 | 0.05 | 0.05 | 0.005 | 0.05 |
|   | L | — | — | — | — | — | — | — | — | — |
|   | M | — | — | — | — | — | — | — | — | — |
|   | N | — | — | — | — | — | — | — | — | — |
|   | O | — | — | — | — | — | — | — | — | — |
|   | P | — | — | — | — | — | — | — | — | — |
|   | Q | — | — | — | — | — | — | — | — | — |
|   | R | 0.05 | 0.5 | 2.5 | 2.5 | 0.05 | 2.5 | 2.5 | 0.05 | 2.5 |
|   | S | 0.05 | 0.5 | 2.5 | 2.5 | 0.05 | 2.5 | 2.5 | 0.05 | 2.5 |

| ② (Sample No.) | 40 | 41 | 42 | 43 | 44 | 45 |
|---|---|---|---|---|---|---|
| ③ (Molar ratio) | | | 9.0 | | 5.0 | |
| A D | 100.0 | 100.0 | 100.0 | 100.0 | 100.0 | 100.0 |
| E | 1 | 3 | 10 | — | — | — |
| F | — | — | — | 10 | 10 | 10 |
| B H | 1.0 | 15.0 | — | 5.0 | 5.0— | — |
| I | — | — | — | — | — | 10.0 |
| C J | 0.05 | 0.005 | 0.05 | — | — | — |
| K | 0.05 | 0.005 | 0.05 | — | — | — |
| L | — | — | — | 0.05 | — | — |
| M | — | — | — | 0.05 | — | — |
| N | — | — | — | — | 0.05 | — |
| O | — | — | — | — | 0.05 | — |
| P | — | — | — | — | — | 0.01 |
| Q | — | — | — | — | — | 0.01 |
| R | 2.5 | 0.05 | 2.5 | 0.05 | 0.05 | 0.05 |
| S | 2.5 | 0.05 | 2.5 | 0.05 | 0.05 | 0.05 |

①: Sample No.;
②: Molar ratio;
③: Ingredients
A: Pigment; B: Smoothing agent; C: Catalytic ingredient; D: 20% sodium silicate aqueous solution;
E: Red iron oxide; F: Chrome green; G: Zinc oxide; H: Pearlite powder; I: Diatomaceous earth; J: Spiculisporic acid; K: Calcium spiculisporate; L: Gluconic acid; M: Calcium gluconate; N: Lactic acid; O: Calcium lactate; P: Calcium acetate; Q: Calcium propionate; R: Arabic acid; S: Calcium arabate

TABLE 10

| Evaluation Criteria | Surface smoothness | Luster and tinting ability |
|---|---|---|
| x | Not satisfactorily smooth with cracks on the surface | Poorly tinted |
|  | Smooth with no cracks on the surface | Lustrous and good coloring |
| ○ | Very smooth with no cracks on the surface | Excellent luster and coloring: looks shiny |

TABLE 11

| Criteria | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|
| Surface Smoothness | X | X | ○ | ○ | ⊙ | ⊙ | ○ | ⊙ | ⊙ | ○ | ⊙ | X | ⊙ | ○ | ⊙ |
| Luster & tinting ability | X | X | ○ | ○ | ⊙ | ⊙ | ○ | ⊙ | ⊙ | ○ | ⊙ | X | ⊙ | ⊙ | ⊙ |
| Strength | ○ | ○ | ○ | ○ | ⊙ | ⊙ | ○ | ⊙ | ⊙ | ○ | ○ | ○ | ⊙ | ⊙ | ⊙ |
| Water resistance | X | ○ | ○ | ○ | ⊙ | ⊙ | ○ | ⊙ | ⊙ | ○ | ○ | ○ | ⊙ | ⊙ | ⊙ |
| Reactivity | X | ○ | ○ | ○ | ⊙ | ⊙ | ○ | ⊙ | ⊙ | ○ | ○ | ○ | ⊙ | ⊙ | ⊙ |
| Ease of operation | ○ | X | ○ | ○ | ⊙ | ⊙ | ○ | ⊙ | ⊙ | ○ | ○ | ○ | ⊙ | ⊙ | ⊙ |

As is seen from Table 11 shown above, the results show a similarity to those of the tests on the base reinforcing agent: of Composition Nos. 34–39, each of which had a SiO$_2$/Na$_2$O ratio in the range of 5.0 to 7.5, Composition Nos. 35, 36, 38, 39, 43–45, each of which contained an organic acid and a salt of an organic acid, i.e. spiculisporic acid and its calcium salt, at a weight ratio ranging from 0.01 to 0.1 times the weight ratio of an aqueous solution of sodium silicate remaining after the weight of water has been subtracted and arabic acid and its salt at a weight ratio ranging from 0.1 to 5 times the weight ratio of an aqueous solution of sodium silicate remaining after the weight of water has been subtracted, produced particularly good coating films. As is seen from the results of Composition Nos. 43–45, coating films that were as good as those obtained by using spiculisporic acid and its salt were obtained by an agent having the same composition as any one of said compositions except that a combination of gluconic acid and its salt, a combination of lactic acid and its salt, a salt of acetic acid (used singularly), or a salt of propionic acid (used singularly) were used in place of spiculisporic acid and its salt on condition that any one of these organic acids and their salts had an acid dissociation exponent (pKa) ranging from 3 to 5.

As is seen from the results of Composition Nos. 31–33 and 40–42, adding porous, amorphous silica-based powder having a particle diameter ranging from 0.5 µm to 5 µm at the weight ratio ranging from 1.0 to 15.0 times the weight ratio of an aqueous solution of sodium silicate remaining after the weight of water has been subtracted prevents cracks on the surface of a coating film and thus produces a good coating film having a lustrous and very smooth surface. Both calcined pearlite powder and diatomaceous earth produced good coating films with no apparent difference in their surface smoothness or luster.

Like the base reinforcing agent, of the samples having a $SiO_2/Na_2O$ ratio of 4.0, Composition No. 33 having a greater proportion of organic acids and salts of organic acids showed particularly satisfactory results. Among the samples having a $SiO_2/Na_2O$ ratio of 9.0, however, differences in ratios of the organic acids and their salts did not produce remarkable difference in the results. This seems to be attributed to the fact that the organic acids used had virtually the same acid dissociation exponent. Furthermore using mica as the porous, amorphous silica-based powder also resulted in a good film having a quite lustrous and smooth surface.

INDUSTRIAL APPLICABILITY

As described above, a surface treatment agent according to the present invention and a treatment method using said treatment agent are applicable to coloring or treatment for prevention of deterioration of the surface of a plastic member, woven fabric, non-woven fabric, wood, metal, ceramics or such a concrete member as concrete or mortar.

What is claimed is:

1. A surface treatment agent comprising:
   an adhesive polymeric water emulsion applied onto a surface of a base member to provide a film of said adhesive polymeric water emulsion, said adhesive polymeric water emulsion containing either one of or both of hydroxyl groups (—OH) and carboxyl groups (—COOH);
   a silica-based granular material comprised of silicon oxide ($SiO_2$) and supported by said adhesive polymeric water emulsion wherein at least a part of said adhesive polymeric water emulsion is covered by said silica-based granular material;
   a liquid base treatment agent containing a silica-based powder or granular material comprised of silicon oxide ($SiO_2$), a calcium-containing substance containing either one of or both of calcium hydroxide ($Ca(OH)_2$) and calcium oxide (CaO), water ($H_2O$), and either one of or both of an organic acid and an organic acid salt having an acid dissociation exponent (pKa) ranging from 3 to 5 to provide an aqueous alkali silicate solution, said base treatment agent applied onto a surface of a coating film of said adhesive polymeric water emulsion to provide a film wherein said silica-based granular material is covered by said base treatment agent; and
   a liquid base reinforcing agent applied onto a surface of a coating film of said base treatment agent on said polymeric water emulsion to provide a film, said base reinforcing agent containing an aqueous solution of alkali silicate, and either one of or both of an organic acid and an organic acid salt having an acid dissociation exponent (pKa) ranging from 3 to 5.

2. A surface treatment agent as claimed in claim 1, wherein said surface treatment agent includes a liquid coloring agent containing an aqueous solution of alkali silicate, a pigment, and either one of or both of an organic acid and an organic acid salt having an acid dissociation exponent (pKa) ranging from 3 to 5, said coloring agent applied onto a surface of a coating film of said base reinforcing agent.

3. A surface treatment agent as claimed in claim 1, wherein at least one of said agents is selected from the group consisting of said base treatment agent and said base reinforcing agent, and contains metal oxide.

4. A surface treatment agent as claimed in claim 2, wherein at least one of said agents is selected from the group consisting of said base treatment agent, said base reinforcing agent, and said coloring agent, and contains metal oxide.

5. A surface treatment agent as claimed claim 1, wherein said calcium-containing substance in said base treatment agent contains either one of or both of calcium hydroxide and calcium oxide at a total weight ratio, calculated in terms of said calcium hydroxide, of 0.2 to 2 times a weight ratio of said silica-based powder or said granular material.

6. A surface treatment agent as claimed claim 2, wherein said calcium-containing substance in said base treatment agent contains either one of or both of calcium hydroxide and calcium oxide at a total weight ratio, calculated in terms of said calcium hydroxide, of 0.2 to 2 times a weight ratio of said silica-based powder or said granular material.

7. A surface treatment agent as claimed claim 3, wherein said calcium-containing substance in said base treatment agent contains either one of or both of calcium hydroxide and calcium oxide at a total weight ratio, calculated in terms of said calcium hydroxide, of 0.2 to 2 times a weight ratio of said silica-based powder or said granular material.

8. A surface treatment agent as claimed claim 4, wherein said calcium-containing substance in said base treatment agent contains either one of or both of calcium hydroxide and calcium oxide at a total weight ratio, calculated in terms of said calcium hydroxide, of 0.2 to 2 times a weight ratio of said silica-based powder or said granular material.

9. A surface treatment agent as claimed in claim 1, wherein said organic acid and said organic acid salt contained in said base treatment agent contain:
   at least one of an organic acid or an organic acid salt selected from the group consisting of gluconic acid, spiculisporic acid, lactic acid, acetic acid, propionic acid, and salts thereof and having a total weight ratio of 0.01 to 0.1 times a total weight ratio of said silica-based powder or said granular material and said calcium-containing substance, and
   either one of or both of arabic acid and an arabic acid salt having a total weight ratio of 0.1 to 0.5 times said total weight ratio of said silica-based powder or said granular material and said calcium-containing substance.

10. A surface treatment agent as claimed in claim 2, wherein said organic acid and said organic acid salt contained in said base treatment agent contain:
    at least one of an organic acid or an organic acid salt selected from the group consisting of gluconic acid, spiculisporic acid, lactic acid, acetic acid, propionic acid, and salts thereof and having a total weight ratio of 0.01 to 0.1 times a total weight ratio of said silica-based powder or said granular material and said calcium-containing substance, and either one of or both of arabic acid and an arabic acid salt having a total weight ratio of 0.1 to 0.5 times said total weight ratio of said silica-based powder or said granular material and said calcium-containing substance.

11. A surface treatment agent as claimed in claim 3, wherein said organic acid and said organic acid salt contained in said base treatment agent contain:
   at least one of an organic acid or an organic acid salt selected from the group consisting of gluconic acid, spiculisporic acid, lactic acid, acetic acid, propionic acid, and salts thereof and having a total weight ratio of 0.01 to 0.1 times a total weight ratio of said silica-based powder or said granular material and said calcium-containing substance, and
   either one of or both of arabic acid and an arabic acid salt having a total weight ratio of 0.1 to 0.5 times said total weight ratio of said silica-based powder or said granular material and said calcium-containing substance.

12. A surface treatment agent as claimed in claim 4, wherein said organic acid and said organic acid salt contained in said base treatment agent contain:
   at least one of an organic acid or an organic acid salt selected from the group consisting of gluconic acid, spiculisporic acid, lactic acid, acetic acid, propionic acid, and salts thereof and having a total weight ratio of 0.01 to 0.1 times a total weight ratio of said silica-based powder or said granular material and said calcium-containing substance, and
   either one of or both of arabic acid and an arabic acid salt having a total weight ratio of 0.1 to 0.5 times said total weight ratio of said silica-based powder or said granular material and said calcium-containing substance.

13. A surface treatment agent as claimed in claim 5, wherein said organic acid and said organic acid salt contained in said base treatment agent contain:
   at least one of an organic acid or an organic acid salt selected from the group consisting of gluconic acid, spiculisporic acid, lactic acid, acetic acid, propionic acid, and salts thereof and having a total weight ratio of 0.01 to 0.1 times a total weight ratio of said silica-based powder or said granular material and said calcium-containing substance, and
   either one of or both of arabic acid and an arabic acid salt having a total weight ratio of 0.1 to 0.5 times said total weight ratio of said silica-based powder or said granular material and said calcium-containing substance.

14. A surface treatment agent as claimed in claim 6, wherein said organic acid and said organic acid salt contained in said base treatment agent contain:
   at least one of an organic acid or an organic acid salt selected from the group consisting of gluconic acid, spiculisporic acid, lactic acid, acetic acid, propionic acid, and salts thereof and having a total weight ratio of 0.01 to 0.1 times a total weight ratio of said silica-based powder or said granular material and said calcium-containing substance, and
   either one of or both of arabic acid and an arabic acid salt having a total weight ratio of 0.1 to 0.5 times said total weight ratio of said silica-based powder or said granular material and said calcium-containing substance.

15. A surface treatment agent as claimed in claim 7, wherein said organic acid and said organic acid salt contained in said base treatment agent contain:
   at least one of an organic acid or an organic acid salt selected from the group consisting of gluconic acid, spiculisporic acid, lactic acid, acetic acid, propionic acid, and salts thereof and having a total weight ratio of 0.01 to 0.1 times a total weight ratio of said silica-based powder or said granular material and said calcium-containing substance, and
   either one of or both of arabic acid and an arabic acid salt having a total weight ratio of 0.1 to 0.5 times said total weight ratio of said silica-based powder or said granular material and said calcium-containing substance.

16. A surface treatment agent as claimed in claim 8, wherein said organic acid and said organic acid salt contained in said base treatment agent contain:
   at least one of an organic acid or an organic acid salt selected from the group consisting of gluconic acid, spiculisporic acid, lactic acid, acetic acid, propionic acid, and salts thereof and having a total weight ratio of 0.01 to 0.1 times a total weight ratio of said silica-based powder or said granular material and said calcium-containing substance, and
   either one of or both of arabic acid and an arabic acid salt having a total weight ratio of 0.1 to 0.5 times said total weight ratio of said silica-based powder or said granular material and said calcium-containing substance.

17. A surface treatment agent as claimed in claim 1, wherein said aqueous alkali silicate solution is a 15 to 40% solution of an alkali silicate, of which the molar ratio of the silicon oxide ($SiO_2$) is in the range of 5 to 7.5.

18. A surface treatment agent as claimed in claim 2, wherein said aqueous alkali silicate solution is a 15 to 40% solution of an alkali silicate, of which the molar ratio of the silicon oxide ($SiO_2$) is in the range of 5 to 7.5.

19. A surface treatment agent as claimed in claim 3, wherein said aqueous alkali silicate solution is a 15 to 40% solution of an alkali silicate, of which the molar ratio of the silicon oxide ($SiO_2$) is in the range of 5 to 7.5.

20. A surface treatment agent as claimed in claim 4, wherein said aqueous alkali silicate solution is a 15 to 40% solution of an alkali silicate, of which the molar ratio of the silicon oxide ($SiO_2$) is in the range of 5 to 7.5.

21. A surface treatment agent as claimed in claim 5, wherein said aqueous alkali silicate solution is a 15 to 40% solution of an alkali silicate, of which the molar ratio of the silicon oxide ($SiO_2$) is in the range of 5 to 7.5.

22. A surface treatment agent as claimed in claim 6, wherein said aqueous alkali silicate solution is a 15 to 40% solution of an alkali silicate, of which the molar ratio of the silicon oxide ($SiO_2$) is in the range of 5 to 7.5.

23. A surface treatment agent as claimed in claim 7, wherein said aqueous alkali silicate solution is a 15 to 40% solution of an alkali silicate, of which the molar ratio of the silicon oxide ($SiO_2$) is in the range of 5 to 7.5.

24. A surface treatment agent as claimed in claim 8, wherein said aqueous alkali silicate solution is a 15 to 40% solution of an alkali silicate, of which the molar ratio of the silicon oxide ($SiO_2$) is in the range of 5 to 7.5.

25. A surface treatment agent as claimed in claim 9, wherein said aqueous alkali silicate solution is a 15 to 40% solution of an alkali silicate, of which the molar ratio of the silicon oxide ($SiO_2$) is in the range of 5 to 7.5.

26. A surface treatment agent as claimed in claim 10, wherein said aqueous alkali silicate solution is a 15 to 40% solution of an alkali silicate, of which the molar ratio of the silicon oxide ($SiO_2$) is in the range of 5 to 7.5.

27. A surface treatment agent as claimed in claim 11, wherein said aqueous alkali silicate solution is a 15 to 40% solution of an alkali silicate, of which the molar ratio of the silicon oxide ($SiO_2$) is in the range of 5 to 7.5.

28. A surface treatment agent as claimed in claim 12, wherein said aqueous alkali silicate solution is a 15 to 40% solution of an alkali silicate, of which the molar ratio of the silicon oxide ($SiO_2$) is in the range of 5 to 7.5.

29. A surface treatment agent as claimed in claim 13, wherein said aqueous alkali silicate solution is a 15 to 40% solution of an alkali silicate, of which the molar ratio of the silicon oxide ($SiO_2$) is in the range of 5 to 7.5.

30. A surface treatment agent as claimed in claim 14, wherein said aqueous alkali silicate solution is a 15 to 40% solution of an alkali silicate, of which the molar ratio of the silicon oxide ($SiO_2$) is in the range of 5 to 7.5.

31. A surface treatment agent as claimed in claim 15, wherein said aqueous alkali silicate solution is a 15 to 40% solution of an alkali silicate, of which the molar ratio of the silicon oxide ($SiO_2$) is in the range of 5 to 7.5.

32. A surface treatment agent as claimed in claim 16, wherein said aqueous alkali silicate solution is a 15 to 40% solution of an alkali silicate, of which the molar ratio of the silicon oxide ($SiO_2$) is in the range of 5 to 7.5.

33. A surface treatment agent as claimed claim 3, wherein said metal oxide has a weight ratio of 0.1 to 5 times that of said aqueous alkali silicate solution remaining after the weight of water has been subtracted.

34. A surface treatment agent as claimed claim 4, wherein said metal oxide has a weight ratio of 0.1 to 5 times that of said aqueous alkali silicate solution remaining after the weight of water has been subtracted.

35. A surface treatment agent as claimed claim 5, wherein said metal oxide has a weight ratio of 0.1 to 5 times that of said aqueous alkali silicate solution remaining after the weight of water has been subtracted.

36. A surface treatment agent as claimed claim 6, wherein said metal oxide has a weight ratio of 0.1 to 5 times that of said aqueous alkali silicate solution remaining after the weight of water has been subtracted.

37. A surface treatment agent as claimed claim 7, wherein said metal oxide has a weight ratio of 0.1 to 5 times that of said aqueous alkali silicate solution remaining after the weight of water has been subtracted.

38. A surface treatment agent as claimed claim 8, wherein said metal oxide has a weight ratio of 0.1 to 5 times that of said aqueous alkali silicate solution remaining after the weight of water has been subtracted.

39. A surface treatment agent as claimed claim 9, wherein said metal oxide has a weight ratio of 0.1 to 5 times that of said aqueous alkali silicate solution remaining after the weight of water has been subtracted.

40. A surface treatment agent as claimed claim 10, wherein said metal oxide has a weight ratio of 0.1 to 5 times that of said aqueous alkali silicate solution remaining after the weight of water has been subtracted.

41. A surface treatment agent as claimed claim 11, wherein said metal oxide has a weight ratio of 0.1 to 5 times that of said aqueous alkali silicate solution remaining after the weight of water has been subtracted.

42. A surface treatment agent as claimed claim 12, wherein said metal oxide has a weight ratio of 0.1 to 5 times that of said aqueous alkali silicate solution remaining after the weight of water has been subtracted.

43. A surface treatment agent as claimed claim 13, wherein said metal oxide has a weight ratio of 0.1 to 5 times that of said aqueous alkali silicate solution remaining after the weight of water has been subtracted.

44. A surface treatment agent as claimed claim 14, wherein said metal oxide has a weight ratio of 0.1 to 5 times that of said aqueous alkali silicate solution remaining after the weight of water has been subtracted.

45. A surface treatment agent as claimed claim 15, wherein said metal oxide has a weight ratio of 0.1 to 5 times that of said aqueous alkali silicate solution remaining after the weight of water has been subtracted.

46. A surface treatment agent as claimed claim 16, wherein said metal oxide has a weight ratio of 0.1 to 5 times that of said aqueous alkali silicate solution remaining after the weight of water has been subtracted.

47. A surface treatment agent as claimed claim 17, wherein said metal oxide has a weight ratio of 0.1 to 5 times that of said aqueous alkali silicate solution remaining after the weight of water has been subtracted.

48. A surface treatment agent as claimed claim 18, wherein said metal oxide has a weight ratio of 0.1 to 5 times that of said aqueous alkali silicate solution remaining after the weight of water has been subtracted.

49. A surface treatment agent as claimed claim 19, wherein said metal oxide has a weight ratio of 0.1 to 5 times that of said aqueous alkali silicate solution remaining after the weight of water has been subtracted.

50. A surface treatment agent as claimed claim 20, wherein said metal oxide has a weight ratio of 0.1 to 5 times that of said aqueous alkali silicate solution remaining after the weight of water has been subtracted.

51. A surface treatment agent as claimed claim 21, wherein said metal oxide has a weight ratio of 0.1 to 5 times that of said aqueous alkali silicate solution remaining after the weight of water has been subtracted.

52. A surface treatment agent as claimed claim 22, wherein said metal oxide has a weight ratio of 0.1 to 5 times that of said aqueous alkali silicate solution remaining after the weight of water has been subtracted.

53. A surface treatment agent as claimed claim 23, wherein said metal oxide has a weight ratio of 0.1 to 5 times that of said aqueous alkali silicate solution remaining after the weight of water has been subtracted.

54. A surface treatment agent as claimed claim 24, wherein said metal oxide has a weight ratio of 0.1 to 5 times that of said aqueous alkali silicate solution remaining after the weight of water has been subtracted.

55. A surface treatment agent as claimed claim 25, wherein said metal oxide has a weight ratio of 0.1 to 5 times that of said aqueous alkali silicate solution remaining after the weight of water has been subtracted.

56. A surface treatment agent as claimed claim 26, wherein said metal oxide has a weight ratio of 0.1 to 5 times that of said aqueous alkali silicate solution remaining after the weight of water has been subtracted.

57. A surface treatment agent as claimed claim 27, wherein said metal oxide has a weight ratio of 0.1 to 5 times that of said aqueous alkali silicate solution remaining after the weight of water has been subtracted.

58. A surface treatment agent as claimed claim 28, wherein said metal oxide has a weight ratio of 0.1 to 5 times that of said aqueous alkali silicate solution remaining after the weight of water has been subtracted.

59. A surface treatment agent as claimed claim 29, wherein said metal oxide has a weight ratio of 0.1 to 5 times that of said aqueous alkali silicate solution remaining after the weight of water has been subtracted.

60. A surface treatment agent as claimed claim 30, wherein said metal oxide has a weight ratio of 0.1 to 5 times that of said aqueous alkali silicate solution remaining after the weight of water has been subtracted.

61. A surface treatment agent as claimed claim 31, wherein said metal oxide has a weight ratio of 0.1 to 5 times that of said aqueous alkali silicate solution remaining after the weight of water has been subtracted.

62. A surface treatment agent as claimed claim 32, wherein said metal oxide has a weight ratio of 0.1 to 5 times that of said aqueous alkali silicate solution remaining after the weight of water has been subtracted.

63. A surface treatment agent as claimed in claim 1, wherein said base reinforcing agent comprises:
  at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
  either one of or both of arabic acid and an arabic acid salt having a total weight ratio of 0.1 to 0.5 times a weight ratio of said aqueous alkali silicate solution remaining after the weight of water has been subtracted.

64. A surface treatment agent as claimed in claim 2, wherein said organic acid and said organic acid salt present in either one of or both of said base reinforcing agent and said coloring agent comprises:
  at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
  either one of or both of arabic acid and an arabic acid salt having a total weight ratio of 0.1 to 0.5 times a weight ratio of said aqueous alkali silicate solution remaining after the weight of water has been subtracted.

65. A surface treatment agent as claimed in claim 4, wherein said organic acid and said organic acid salt present in either one of or both of said base reinforcing agent and said coloring agent comprises:
  at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
  either one of or both of arabic acid and an arabic acid salt having a total weight ratio of 0.1 to 0.5 times a weight ratio of said aqueous alkali silicate solution remaining after the weight of water has been subtracted.

66. A surface treatment agent as claimed in claim 6, wherein said organic acid and said organic acid salt present in either one of or both of said base reinforcing agent and said coloring agent comprises:
  at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
  either one of or both of arabic acid and an arabic acid salt having a total weight ratio of 0.1 to 0.5 times a weight ratio of said aqueous alkali silicate solution remaining after the weight of water has been subtracted.

67. A surface treatment agent as claimed in claim 7, wherein said organic acid and said organic acid salt present in either one of or both of said base reinforcing agent and said coloring agent comprises:
  at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
  either one of or both of arabic acid and an arabic acid salt having a total weight ratio of 0.1 to 0.5 times a weight ratio of said aqueous alkali silicate solution remaining after the weight of water has been subtracted.

68. A surface treatment agent as claimed in claim 8, wherein said organic acid and said organic acid salt present in either one of or both of said base reinforcing agent and said coloring agent comprises:
  at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
  either one of or both of arabic acid and an arabic acid salt having a total weight ratio of 0.1 to 0.5 times a weight ratio of said aqueous alkali silicate solution remaining after the weight of water has been subtracted.

69. A surface treatment agent as claimed in claim 10, wherein said organic acid and said organic acid salt present in either one of or both of said base reinforcing agent and said coloring agent comprises:
  at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
  either one of or both of arabic acid and an arabic acid salt having a total weight ratio of 0.1 to 0.5 times a weight ratio of said aqueous alkali silicate solution remaining after the weight of water has been subtracted.

70. A surface treatment agent as claimed in claim 11, wherein said organic acid and said organic acid salt present in
  either one of or both of said base reinforcing agent and said coloring agent comprises:
  at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
  either one of or both of arabic acid and an arabic acid salt having a total weight ratio of 0.1 to 0.5 times a weight ratio of said aqueous alkali silicate solution remaining after the weight of water has been subtracted.

71. A surface treatment agent as claimed in claim 12, wherein said organic acid and said organic acid salt present in either one of or both of said base reinforcing agent and said coloring agent comprises:
  at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

72. A surface treatment agent as claimed in claim 13, wherein said organic acid and said organic acid salt present in either one of or both of said base reinforcing agent and said coloring agent comprises:
    at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
    either one of or both of arabic acid and an arabic acid salt having a total weight ratio of 0.1 to 0.5 times a weight ratio of said aqueous alkali silicate solution remaining after the weight of water has been subtracted.

73. A surface treatment agent as claimed in claim 14, wherein said organic acid and said organic acid salt present in either one of or both of said base reinforcing agent and said coloring agent comprises:
    at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
    either one of or both of arabic acid and an arabic acid salt having a total weight ratio of 0.1 to 0.5 times a weight ratio of said aqueous alkali silicate solution remaining after the weight of water has been subtracted.

74. A surface treatment agent as claimed in claim 15, wherein said organic acid and said organic acid salt present in either one of or both of said base reinforcing agent and said coloring agent comprises:
    at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
    either one of or both of arabic acid and an arabic acid salt having a total weight ratio of 0.1 to 0.5 times a weight ratio of said aqueous alkali silicate solution remaining after the weight of water has been subtracted.

75. A surface treatment agent as claimed in claim 16, wherein said organic acid and said organic acid salt present in either one of or both of said base reinforcing agent and said coloring agent comprises:
    at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
    either one of or both of arabic acid and an arabic acid salt having a total weight ratio of 0.1 to 0.5 times a weight ratio of said aqueous alkali silicate solution remaining after the weight of water has been subtracted.

76. A surface treatment agent as claimed in claim 18, wherein said organic acid and said organic acid salt present in either one of or both of said base reinforcing agent and said coloring agent comprises:
    at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
    either one of or both of arabic acid and an arabic acid salt having a total weight ratio of 0.1 to 0.5 times a weight ratio of said aqueous alkali silicate solution remaining after the weight of water has been subtracted.

77. A surface treatment agent as claimed in claim 19, wherein said organic acid and said organic acid salt present in either one of or both of said base reinforcing agent and said coloring agent comprises:
    at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
    either one of or both of arabic acid and an arabic acid salt having a total weight ratio of 0.1 to 0.5 times a weight ratio of said aqueous alkali silicate solution remaining after the weight of water has been subtracted.

78. A surface treatment agent as claimed in claim 20, wherein said organic acid and said organic acid salt present in either one of or both of said base reinforcing agent and said coloring agent comprises:
    at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
    either one of or both of arabic acid and an arabic acid salt having a total weight ratio of 0.1 to 0.5 times a weight ratio of said aqueous alkali silicate solution remaining after the weight of water has been subtracted.

79. A surface treatment agent as claimed in claims 21, wherein said organic acid and said organic acid salt present in either one of or both of said base reinforcing agent and said coloring agent comprises:
    at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
    either one of or both of arabic acid and an arabic acid salt having a total weight ratio of 0.1 to 0.5 times a weight ratio of said aqueous alkali silicate solution remaining after the weight of water has been subtracted.

80. A surface treatment agent as claimed in claim 22, wherein said organic acid and said organic acid salt present in either one of or both of said base reinforcing agent and said coloring agent comprises:
    at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

81. A surface treatment agent as claimed in claim 23, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

82. A surface treatment agent as claimed in claim 24, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

83. A surface treatment agent as claimed in claim 25, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

84. A surface treatment agent as claimed in claim 26, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

85. A surface treatment agent as claimed in claim 27, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

86. A surface treatment agent as claimed in claim 28, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

87. A surface treatment agent as claimed in claim 29, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

88. A surface treatment agent as claimed in claim 30, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

89. A surface treatment agent as claimed in claim 31, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

90. A surface treatment agent as claimed in claim 32, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

91. A surface treatment agent as claimed in claim 33, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

92. A surface treatment agent as claimed in claim 34, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

93. A surface treatment agent as claimed in claim 35, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

94. A surface treatment agent as claimed in claim 36, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

95. surface treatment agent as claimed in claim 37, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

96. A surface treatment agent as claimed in claim 38, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

97. A surface treatment agent as claimed in claim 39, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

98. A surface treatment agent as claimed in claim 40, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

99. A surface treatment agent as claimed in claim 41, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

100. A surface treatment agent as claimed in claim 42, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

101. A surface treatment agent as claimed in claim 43, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

102. A surface treatment agent as claimed in claim 44, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

103. A surface treatment agent as claimed in claim 45, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

104. A surface treatment agent as claimed in claim 46, wherein said organic acid and said organic acid salt present in either one of or both of said base reinforcing agent and said coloring agent comprises:

at least one of said organic acid or said organic acid salt is selected from the group-consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

105. A surface treatment agent as claimed in claim 47, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

106. A surface treatment agent as claimed in claim 48, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight radio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

107. A surface treatment agent as claimed in claim 49, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

108. A surface treatment agent as claimed in claim 50, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

109. A surface treatment agent as claimed in claim 51, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

110. A surface treatment agent as claimed in claim 52, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

111. A surface treatment agent as claimed in claim 53, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

112. A surface treatment agent as claimed in claim 54, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

113. A surface treatment agent as claimed in claim 55, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

114. A surface treatment agent as claimed in claim 56, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

115. A surface treatment agent as claimed in claim 57, wherein said organic acid and said organic acid salt present in either one of or both of said base reinforcing agent and said coloring agent comprises:

at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and either one of or both of arabic acid and an arabic acid salt having a total weight ratio of 0.1 to 0.5 times a weight ratio of said aqueous alkali silicate solution remaining after the weight of water has been subtracted.

116. A surface treatment agent as claimed in claim 58, wherein said organic acid and said organic acid salt present in either one of or both of said base reinforcing agent and said coloring agent comprises:
- at least one of said organic acid or said organic acid salt is selected-from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
- either one of or both of arabic acid and an arabic acid salt having a total weight ratio of 0.1 to 0.5 times a weight ratio of said aqueous alkali silicate solution remaining after the weight of water has been subtracted.

117. A surface treatment agent as claimed in claim 59, wherein said organic acid and said organic acid salt present in either one of or both of said base reinforcing agent and said coloring agent comprises:
- at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
- either one of or both of arabic acid and an arabic acid salt having a total weight ratio of 0.1 to 0.5 times a weight ratio of said aqueous alkali silicate solution remaining after the weight of water has been subtracted.

118. A surface treatment agent as claimed in claim 60, wherein said organic acid and said organic acid salt present in either one of or both of said base reinforcing agent and said coloring agent comprises:
- at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
- either one of or both of arabic acid and an arabic acid salt having a total weight ratio of 0.1 to 0.5 times a weight ratio of said aqueous alkali silicate solution remaining after the weight of water has been subtracted.

119. A surface treatment agent as claimed in claim 61, wherein said organic acid and said organic acid salt present in either one of or both of said base reinforcing agent and said coloring agent comprises:
- at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
- either one of or both of arabic acid and an arabic acid salt having a total weight ratio of 0.1 to 0.5 times a weight ratio of said aqueous alkali silicate solution remaining after the weight of water has been subtracted.

120. A surface treatment agent as claimed in claim 62, wherein said organic acid and said organic acid salt present in either one of or both of said base reinforcing agent and said coloring agent comprises:
- at least one of said organic acid or said organic acid salt is selected from the group consisting of gluconic acid, spiculisporic acid, lactic acid, acetic acid, propionic acid, and salts thereof and having a total weight ratio of 0.01 to 0.1 times a weight ratio of said aqueous alkali silicate solution remaining after the weight of water has been subtracted, and
- either one of or both of arabic acid and an arabic acid salt having a total weight ratio of 0.1 to 0.5 times a weight ratio of said aqueous alkali silicate solution remaining after the weight of water has been subtracted.

121. A surface treatment agent as claimed in claim 1, wherein either one of or both of said base treatment agent and said base reinforcing agent contains at least one pigment.

122. A surface treatment agent as claimed in claim 2, wherein either one of or both of said base treatment agent and said base reinforcing agent contains at least one pigment.

123. A surface treatment agent as claimed in claim 3, wherein either one of or both of said base treatment agent and said base reinforcing agent contains at least one pigment.

124. A surface treatment agent as claimed in claim 4, wherein either one of or both of said base treatment agent and said base reinforcing agent contains at least one pigment.

125. A surface treatment agent as claimed in claim 5, wherein either one of or both of said base treatment agent and said base reinforcing agent contains at least one pigment.

126. A surface treatment agent as claimed in claim 6, wherein either one of or both of said base treatment agent and said base reinforcing agent contains at least one pigment.

127. A surface treatment agent as claimed in claim 7, wherein either one of or both of said base treatment agent and said base reinforcing agent contains at least one pigment.

128. A surface treatment agent as claimed in claim 8, wherein either one of or both of said base treatment agent and said base reinforcing agent contains at least one pigment.

129. A surface treatment agent as claimed in claim 9, wherein either one of or both of said base treatment agent and said base reinforcing agent contains at least one pigment.

130. A surface treatment agent as claimed in claim 10, wherein either one of or both of said base treatment agent and said base reinforcing agent contains at least one pigment.

131. A surface treatment agent as claimed in claim 11, wherein either one of or both of said base treatment agent and said base reinforcing agent contains at least one pigment.

132. A surface treatment agent as claimed in claim 12, wherein either one of or both of said base treatment agent and said base reinforcing agent contains at least one pigment.

133. A surface treatment agent as claimed in claim 13, wherein either one of or both of said base treatment agent and said base reinforcing agent contains at least one pigment.

134. A surface treatment agent as claimed in claim 14, wherein either one of or both of said base treatment agent and said base reinforcing agent contains at least one pigment.

135. A surface treatment agent as claimed in claim 15, wherein either one of or both of said base treatment agent and said base reinforcing agent contains at least one pigment.

136. A surface treatment agent as claimed in claim 16, wherein either one of or both of said base treatment agent and said base reinforcing agent contains at least one pigment.

137. A surface treatment agent as claimed in claim 17, wherein either one of or both of said base treatment agent and said base reinforcing agent contains at least one pigment.

138. A surface treatment agent as claimed in claim 18, wherein either one of or both of said base treatment agent and said base reinforcing agent contains at least one pigment.

139. A surface treatment agent as claimed in claim 19, wherein either one of or both of said base treatment agent and said base reinforcing agent contains at least one pigment.

140. A surface treatment agent as claimed in claim 20, wherein either one of or both of said base treatment agent and said base reinforcing agent contains at least one pigment.

141. A surface treatment agent as claimed in claim 21, wherein either one of or both of said base treatment agent and said base reinforcing agent contains at least one pigment.

142. A surface treatment agent as claimed in claim 22, wherein either one of or both of said base treatment agent and said base reinforcing agent contains at least one pigment.

143. A surface treatment agent as claimed in claim 23, wherein either one of or both of said base treatment agent and said base reinforcing agent contains at least one pigment.

144. A surface treatment agent as claimed in claim 24, wherein either one of or both of said base treatment agent and said base reinforcing agent contains at least one pigment.

145. A surface treatment agent as claimed in claim 25, wherein either one of or both of said base treatment agent and said base reinforcing agent contains at least one pigment.

146. A surface treatment agent as claimed in claim 26, wherein either one of or both of said base treatment agent and said base reinforcing agent contains at least one pigment.

147. A surface treatment agent as claimed in claim 27, wherein either one of or both of said base treatment agent and said base reinforcing agent contains at least one pigment.

148. A surface treatment agent as claimed in claim 28, wherein either one of or both of said base treatment agent and said base reinforcing agent contains at least one pigment.

149. A surface treatment agent as claimed in claim 29, wherein either one of or both of said base treatment agent and said base reinforcing agent contains at least one pigment.

150. A surface treatment agent as claimed in claim 30, wherein either one of or both of said base treatment agent and said base reinforcing agent contains at least one pigment.

151. A surface treatment agent as claimed in claim 31, wherein either one of or both of said base treatment agent and said base reinforcing agent contains at least one pigment.

152. A surface treatment agent as claimed in claim 32, wherein either one of or both of said base treatment agent and said base reinforcing agent contains at least one pigment.

153. A surface treatment agent as claimed in claim 33, wherein either one of or both of said base treatment agent and said base reinforcing agent contains at least one pigment.

154. A surface treatment agent as claimed in claim 34, wherein either one of or both of said base treatment agent and said base reinforcing agent contains at least one pigment.

155. A surface treatment agent as claimed in claim 35, wherein either one of or both of said base treatment agent and said base reinforcing agent contains at least one pigment.

156. A surface treatment agent as claimed in claim 36, wherein either one of or both of said base treatment agent and said base reinforcing agent contains at least one pigment.

157. A surface treatment agent as claimed in claim 37, wherein either one of or both of said base treatment agent and said base reinforcing agent contains at least one pigment.

158. A surface treatment agent as claimed in claim 38, wherein either one of or both of said base treatment agent and said base reinforcing agent contains at least one pigment.

159. A surface treatment agent as claimed in claim 39, wherein either one of or both of said base treatment agent and said base reinforcing agent contains at least one pigment.

160. A surface treatment agent as claimed in claim 40, wherein either one of or both of said base treatment agent and said base reinforcing agent contains at least one pigment.

161. A surface treatment agent as claimed in claim 41, wherein either one of or both of said base treatment agent and said base reinforcing agent contains at least one pigment.

162. A surface treatment agent as claimed in claim 42, wherein either one of or both of said base treatment agent and said base reinforcing agent contains at least one pigment.

163. A surface treatment agent as claimed in claim 43, wherein either one of or both of said base treatment agent and said base reinforcing agent contains at least one pigment.

164. A surface treatment agent as claimed in claim 44, wherein either one of or both of said base treatment agent and said base reinforcing agent contains at least one pigment.

165. A surface treatment agent as claimed in claim 45, wherein either one of or both of said base treatment agent and said base reinforcing agent contains at least one pigment.

166. A surface treatment agent as claimed in claim 46, wherein either one of or both of said base treatment agent and said base reinforcing agent contains at least one pigment.

167. A surface treatment agent as claimed in claim 47, wherein either one of or both of said base treatment agent and said base reinforcing agent contains at least one pigment.

168. A surface treatment agent as claimed in claim 48, wherein either one of or both of said base treatment agent and said base reinforcing agent contains at least one pigment.

169. A surface treatment agent as claimed in claim 49, wherein either one of or both of said base treatment agent and said base reinforcing agent contains at least one pigment.

170. A surface treatment agent as claimed in claim 50, wherein either one of or both of said base treatment agent and said base reinforcing agent contains at least one pigment.

171. A surface treatment agent as claimed in claim 51, wherein either one of or both of said base treatment agent and said base reinforcing agent contains at least one pigment.

172. A surface treatment agent as claimed in claim 52, wherein either one of or both of said base treatment agent and said base reinforcing-agent contains at least one pigment.

173. A surface treatment agent as claimed in claim 53, wherein either one of or both of said base treatment agent and said base reinforcing agent contains at least one pigment.

174. A surface treatment agent as claimed in claim 54, wherein either one of or both of said base treatment agent and said base reinforcing agent contains at least one pigment.

175. A surface treatment agent as claimed in claim 55, wherein either one of or both of said base treatment agent and said base reinforcing agent contains at least one pigment.

176. A surface treatment agent as claimed in claim 56, wherein either one of or both of said base treatment agent and said base reinforcing agent contains at least one pigment.

177. A surface treatment agent as claimed in claim 57, wherein either one of or both of said base treatment agent and said base reinforcing agent contains at least one pigment.

178. A surface treatment agent as claimed in claim 58, wherein either one of or both of said base treatment agent and said base reinforcing agent contains at least one pigment.

179. A surface treatment agent as claimed in claim 59, wherein either one of or both of said base treatment agent and said base reinforcing agent contains at least one pigment.

180. A surface treatment agent as claimed in claim 60, wherein either one of or both of said base treatment agent and said base reinforcing agent contains at least one pigment.

181. A surface treatment agent as claimed in claim 61, wherein either one of or both of said base treatment agent and said base reinforcing agent contains at least one pigment.

182. A surface treatment agent as claimed in claim 62, wherein either one of or both of said base treatment agent and said base reinforcing agent contains at least one pigment.

183. A surface treatment agent as claimed in claim 63, wherein either one of or both of said base treatment agent and said base reinforcing agent contains at least one pigment.

184. A surface treatment agent as claimed in claim 64, wherein either one of or both of said base treatment agent and said base reinforcing agent contains at least one pigment.

185. A surface treatment agent as claimed in claim 65, wherein either one of or both of said base treatment agent and said base reinforcing agent contains at least one pigment.

186. A surface treatment agent as claimed in claim 66, wherein either one of or both of said base treatment agent and said base reinforcing agent contains at least one pigment.

187. A surface treatment agent as claimed in claim 67, wherein either one of or both of said base treatment agent and said base reinforcing agent contains at least one pigment.

188. A surface treatment agent as claimed in claim 68, wherein either one of or both of said base treatment agent and said base reinforcing agent contains at least one pigment.

189. A surface treatment agent as claimed in claim 69, wherein either one of or both of said base treatment agent and said base reinforcing agent contains at least one pigment.

190. A surface treatment agent as claimed in claim 70, wherein either one of or both of said base treatment agent and said base reinforcing agent contains at least one pigment.

191. A surface treatment agent as claimed in claim 71, wherein either one of or both of said base treatment agent and said base reinforcing agent contains at least one pigment.

192. A surface treatment agent as claimed in claim 72, wherein either one of or both of said base treatment agent and said base reinforcing agent contains at least one pigment.

193. A surface treatment agent as claimed in claim 73, wherein either one of or both of said base treatment agent and said base reinforcing agent contains at least one pigment.

194. A surface treatment agent as claimed in claim 74, wherein either one of or both of said base treatment agent and said base reinforcing agent contains at least one pigment.

195. A surface treatment agent as claimed in claim 75, wherein either one of or both of said base treatment agent and said base reinforcing agent contains at least one pigment.

196. A surface treatment agent as claimed in claim 76, wherein either one of or both of said base treatment agent and said base reinforcing agent contains at least one pigment.

197. A surface treatment agent as claimed in claim 77, wherein either one of or both of said base treatment agent and said base reinforcing agent contains at least one pigment.

198. A surface treatment agent as claimed in claim 78, wherein either one of or both of said base treatment agent and said base reinforcing agent contains at least one pigment.

199. A surface treatment agent as claimed in claim 79, wherein either one of or both of said base treatment agent and said base reinforcing agent contains at least one pigment.

200. A surface treatment agent as claimed in claim 80, wherein either one of or both of said base treatment agent and said base reinforcing agent contains at least one pigment.

201. A surface treatment agent as claimed in claim 81, wherein either one of or both of said base treatment agent and said base reinforcing agent contains at least one pigment.

202. A surface treatment agent as claimed in claim 82, wherein either one of or both of said base treatment agent and said base reinforcing agent contains at least one pigment.

203. A surface treatment agent as claimed in claim 83, wherein either one of or both of said base treatment agent and said base reinforcing agent contains at least one pigment.

204. A surface treatment agent as claimed in claim 84, wherein either one of or both of said base treatment agent and said base reinforcing agent contains at least one pigment.

205. A surface treatment agent as claimed in claim 85, wherein either one of or both of said base treatment agent and said base reinforcing agent contains at least one pigment.

206. A surface treatment agent as claimed in claim 86, wherein either one of or both of said base treatment agent and said base reinforcing agent contains at least one pigment.

207. A surface treatment agent as claimed in claim 87, wherein either one of or both of said base treatment agent and said base reinforcing agent contains at least one pigment.

208. A surface treatment agent as claimed in claim 88, wherein either one of or both of said base treatment agent and said base reinforcing agent contains at least one pigment.

209. A surface treatment agent as claimed in claims 89, wherein either one of or both of said base treatment agent and said base reinforcing agent contains at least one pigment.

210. A surface treatment agent as claimed in claim 90, wherein either one of or both of said base treatment agent and said base reinforcing agent contains at least one pigment.

211. A surface treatment agent as claimed in claim 91, wherein either one of or both of said base treatment agent and said base reinforcing agent contains at least one pigment.

212. A surface treatment agent as claimed in claim 92, wherein either one of or both of said base treatment agent and said base reinforcing agent contains at least one pigment.

213. A surface treatment agent as claimed in claim 93, wherein either one of or both of said base treatment agent and said base reinforcing agent contains at least one pigment.

214. A surface treatment agent as claimed in claim 94, wherein either one of or both of said base treatment agent and said base reinforcing agent contains at least one pigment.

215. A surface treatment agent as claimed in claim 95, wherein either one of or both of said base treatment agent and said base reinforcing agent contains at least one pigment.

216. A surface treatment agent as claimed in claim 96, wherein either one of or both of said base treatment agent and said base reinforcing agent contains at least one pigment.

217. A surface treatment agent as claimed in claim 97, wherein either one of or both of said base treatment agent and said base reinforcing agent contains at least one pigment.

218. A surface treatment agent as claimed in claim 98, wherein either one of or both of said base treatment agent and said base reinforcing agent contains at least one pigment.

219. A surface treatment agent as claimed in claim 99, wherein either one of or both of said base treatment agent and said base reinforcing agent contains at least one pigment.

220. A surface treatment agent as claimed in claim 100, wherein either one of or both of said base treatment agent and said base reinforcing agent contains at least one pigment.

221. A surface treatment agent as claimed in claim 101, wherein either one of or both of said base treatment agent and said base reinforcing agent contains at least one pigment.

222. A surface treatment agent as claimed in claim 102, wherein either one of or both of said base treatment agent and said base reinforcing agent contains at least one pigment.

223. A surface treatment agent as claimed in claim 103, wherein either one of or both of said base treatment agent and said base reinforcing agent contains at least one pigment.

224. A surface treatment agent as claimed in claim 104, wherein either one of or both of said base treatment agent and said base reinforcing agent contains at least one pigment.

225. A surface treatment agent as claimed in claim 105, wherein either one of or both of said base treatment agent and said base reinforcing agent contains at least one pigment.

226. A surface treatment agent as claimed in claim 106, wherein either one of or both of said base treatment agent and said base reinforcing agent contains at least one pigment.

227. A surface treatment agent as claimed in claim 107, wherein either one of or both of said base treatment agent and said base reinforcing agent contains at least one pigment.

228. A surface treatment agent as claimed in claim 108, wherein either one of or both of said base treatment agent and said base reinforcing agent contains at least one pigment.

229. A surface treatment agent as claimed in claim 109, wherein either one of or both of said base treatment agent and said base reinforcing agent contains at least one pigment.

230. A surface treatment agent as claimed in claim 110, wherein either one of or both of said base treatment agent and said base reinforcing agent contains at least one pigment.

231. A surface treatment agent as claimed in claim 111, wherein either one of or both of said base treatment agent and said base reinforcing agent contains at least one pigment.

232. A surface treatment agent as claimed in claim 112, wherein either one of or both of said base treatment agent and said base reinforcing agent contains at least one pigment.

233. A surface treatment agent as claimed in claim 113, wherein either one of or both of said base treatment agent and said base reinforcing agent contains at least one pigment.

234. A surface treatment agent as claimed in claim 114, wherein either one of or both of said base treatment agent and said base reinforcing agent contains at least one pigment.

235. A surface treatment agent as claimed in claim 115, wherein either one of or both of said base treatment agent and said base reinforcing agent contains at least one pigment.

236. A surface treatment agent as claimed in claim 116, wherein either one of or both of said base treatment agent and said base reinforcing agent contains at least one pigment.

237. A surface treatment agent as claimed in claim 117, wherein either one of or both of said base treatment agent and said base reinforcing agent contains at least one pigment.

238. A surface treatment agent as claimed in claim 118, wherein either one of or both of said base treatment agent and said base reinforcing agent contains at least one pigment.

239. A surface treatment agent as claimed in claim 119, wherein either one of or both of said base treatment agent and said base reinforcing agent contains at least one pigment.

240. A surface treatment agent as claimed in claim 120, wherein either one of or both of said base treatment agent and said base reinforcing agent contains at least one pigment.

241. A surface treatment agent as claimed in any one of claims 121–240, wherein said pigment is an inorganic pigment having a weight ratio ranging from 0.1 to 12 times the total weight ratio of said silica-based powder or said granular material and said calcium-containing substance or the weight ratio of said aqueous alkali silicate solution remaining after the weight of water has been subtracted.

242. A surface treatment agent as claimed in any one of claims 2, 4, 6–8, 10–16, 18–62, 64–120, or 122–240, wherein either one of or both of said base reinforcing agent and said coloring agent contain a porous, amorphous silica-based powder at a mixing ratio ranging from 1.0 to 15 times the weight ratio of said aqueous alkali silicate solution remaining after the weight of water has been subtracted.

243. A method of treating a surface comprising:

applying an adhesive polymeric water emulsion onto a surface of a base member to provide a film of said adhesive polymeric water emulsion, said adhesive polymeric water emulsion containing either one of or both of hydroxyl groups (—OH) and carboxyl groups (—COOH);

placing a silica-based granular material comprised of silicon oxide ($SiO_2$) on said film of said adhesive polymeric water emulsion before said adhesive polymeric water emulsion hardens wherein at least a part of said adhesive polymeric water emulsion is covered by said silica-based granular material;

forming a liquid base treatment agent containing a silica-based powder or granular material comprised of silicon oxide ($SiO_2$), a calcium-containing substance containing either one of or both of calcium hydroxide ($Ca(OH)_2$) and calcium oxide (CaO), water ($H_2O$), and either one of or both of an organic acid and an organic acid salt having an acid dissociation exponent (pKa) ranging from 3 to 5 to provide an aqueous alkali silicate solution;

applying said base treatment agent onto a surface of said film of said adhesive polymeric water emulsion wherein said silica-based granular material is covered by said base treatment agent; and applying a liquid base reinforcing agent onto a surface of a coating film of said base treatment agent to provide a film of said base reinforcing agent, said base reinforcing agent containing an aqueous solution of alkali silicate, and either one of or both of an organic acid and an organic acid salt having an acid dissociation exponent (pKa) ranging from 3 to 5.

244. A method of treating a surface comprising:

applying an adhesive polymeric water emulsion onto a surface of a base member to provide a film of said adhesive polymeric water emulsion, said adhesive polymeric water emulsion containing either one of or both of hydroxyl groups (—OH) and carboxyl groups (—COOH);

placing a silica-based granular material comprised of silicon oxide ($SiO_2$) on said film of said adhesive polymeric water emulsion before said adhesive polymeric water emulsion hardens wherein at least a part of said adhesive polymeric water emulsion is covered by said silica-based granular material;

forming a liquid base treatment agent containing a silica-based powder or granular material comprised of silicon oxide ($SiO_2$), a calcium-containing substance containing either one of or both of calcium hydroxide ($Ca(OH)_2$) and calcium oxide (CaO), water ($H_2O$), and either one of or both of an organic acid and an organic acid salt having an acid dissociation exponent (pKa) ranging from 3 to 5 to provide an aqueous alkali silicate solution;

applying said base treatment agent onto a surface of said film of said adhesive polymeric water emulsion wherein said silica-based granular material is covered by said base treatment agent; and applying a liquid base reinforcing agent onto a surface of a coating film of said base treatment agent to provide a film of said base reinforcing agent, said base reinforcing agent containing an aqueous solution of alkali silicate, and either one of or both of an organic acid and an organic acid salt having an acid dissociation exponent (pKa) ranging from 3 to 5.

* * * * *

UNITED STATES PATENT AND TRADEMARK OFFICE
CERTIFICATE OF CORRECTION

PATENT NO. : 6,228,430 B1
DATED : May 8, 2001
INVENTOR(S) : Katumi Iwama et al.

It is certified that error appears in the above-identified patent and that said Letters Patent is hereby corrected as shown below:

<u>Title page,</u>
Item [75] Inventors, replace "city of first inventor" with -- Kanagawa, Japan --; replace "city of second inventor" with -- Tokyo, Japan --; replace "city of third inventor" with -- Saitama, Japan --; replace "city of fourth inventor" with -- Chiba, Japan --.
Item [57] ABSTRACT, replace "substance coontaining" with -- substance containing --.

<u>Column 36,</u>
Line 20, replace "as claimed claim 1" with -- as claimed in claim 1 --.
Line 26, replace "as claimed claim 2" with -- as claimed in claim 2 --.
Line 32, replace "as claimed claim 3" with -- as claimed in claim 3 --.
Line 38, replace "as claimed claim 4" with -- as claimed in claim 4 --.

<u>Column 33,</u>
Replace "existing Table 10" with --

TABLE 10

| Evaluation Criteria | Surface smoothness | Luster and tinting ability |
|---|---|---|
| x | Not satisfactorily smooth with cracks on the surface | Poorly tinted |
| ○ | Smooth with no cracks on the surface | Lustrous and good coloring |
| ⊚ | Very smooth with no cracks on the surface | Excellent luster and coloring: looks shiny |

--

UNITED STATES PATENT AND TRADEMARK OFFICE
CERTIFICATE OF CORRECTION

PATENT NO. : 6,228,430 B1
DATED : May 8, 2001
INVENTOR(S) : Katumi Iwama et al.

It is certified that error appears in the above-identified patent and that said Letters Patent is hereby corrected as shown below:

Column 32 and 33,
Replace "existing Table 9" with --

[Table 9]

| | ② | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|---|
| ① | ③ | 4.0 | | | 5.0 | | | 7.5 | | | 9.0 | | | 5.0 | | |
| A | D | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| | E | 1 | 3 | 10 | 1 | 3 | 10 | 1 | 3 | 10 | 1 | 3 | 10 | — | — | — |
| | F | — | — | — | — | — | — | — | — | — | — | — | — | 10 | 10 | 10 |
| | G | 1 | 1 | 1 | 1 | 1 | 1 | 1 | 1 | 1 | 1 | 1 | 1 | 1 | 1 | 1 |
| B | H | — | — | 1.0 | 1.0 | 15.0 | 5.0 | 1.0 | 15.0 | 5.0 | 1.0 | 15.0 | — | 5.0 | 5.0 | — |
| | I | — | — | — | — | — | — | — | — | — | — | — | — | — | — | 10.0 |
| C | J | 0.005 | 0.05 | 0.5 | 0.05 | 0.005 | 0.05 | 0.05 | 0.005 | 0.05 | 0.05 | 0.005 | 0.05 | — | — | — |
| | K | 0.005 | 0.05 | 0.5 | 0.05 | 0.005 | 0.05 | 0.05 | 0.005 | 0.05 | 0.05 | 0.005 | 0.05 | — | — | — |
| | L | — | — | — | — | — | — | — | — | — | — | — | — | 0.05 | — | — |
| | M | — | — | — | — | — | — | — | — | — | — | — | — | 0.05 | — | — |
| | N | — | — | — | — | — | — | — | — | — | — | — | — | — | 0.05 | — |
| | O | — | — | — | — | — | — | — | — | — | — | — | — | — | 0.05 | — |
| | P | — | — | — | — | — | — | — | — | — | — | — | — | — | — | 0.01 |
| | Q | — | — | — | — | — | — | — | — | — | — | — | — | — | — | 0.01 |
| | R | 0.05 | 0.5 | 2.5 | 2.5 | 0.05 | 2.5 | 2.5 | 0.05 | 2.5 | 2.5 | 0.05 | 2.5 | 0.05 | 0.05 | 0.05 |
| | S | 0.05 | 0.5 | 2.5 | 2.5 | 0.05 | 2.5 | 2.5 | 0.05 | 2.5 | 2.5 | 0.05 | 2.5 | 0.05 | 0.05 | 0.05 |

--

Signed and Sealed this

Nineteenth Day of March, 2002

Attest:

JAMES E. ROGAN
Director of the United States Patent and Trademark Office

Attesting Officer

UNITED STATES PATENT AND TRADEMARK OFFICE
CERTIFICATE OF CORRECTION

PATENT NO. : 6,228,430 B1
DATED : May 8, 2001
INVENTOR(S) : Katumi Iwama et al.

It is certified that error appears in the above-identified patent and that said Letters Patent is hereby corrected as shown below:

<u>Title page,</u>
Item [73], Assignee: replace "Shinichi AGIO, Niigata (JP)" with -- Shinichi AGIO, Niigata (JP) and P&E International Inc., Tokyo (JP) --.

Signed and Sealed this

Ninth Day of July, 2002

Attest:

JAMES E. ROGAN
*Attesting Officer*  *Director of the United States Patent and Trademark Office*